(12) United States Patent
Sato et al.

(10) Patent No.: US 10,165,320 B2
(45) Date of Patent: Dec. 25, 2018

(54) REMOTE CONTROL SYSTEM, REMOTE CONTROL COMMANDER, REMOTE CONTROL SERVER

(75) Inventors: Hideki Sato, Kanagawa (JP); Junichi Nakamura, Chiba (JP); Naoki Yuasa, Chiba (JP); Shuichi Otsu, Kanagawa (JP); Hiroki Hashi, Tokyo (JP); Mie Namai, Tokyo (JP)

(73) Assignee: Sony Corporation, Tokyo (JP)

( * ) Notice: Subject to any disclaimer, the term of this patent is extended or adjusted under 35 U.S.C. 154(b) by 1272 days.

(21) Appl. No.: 10/589,992

(22) PCT Filed: Dec. 6, 2005

(86) PCT No.: PCT/JP2005/022340
§ 371 (c)(1),
(2), (4) Date: Aug. 21, 2007

(87) PCT Pub. No.: WO2006/067954
PCT Pub. Date: Jun. 29, 2006

(65) Prior Publication Data
US 2007/0290876 A1   Dec. 20, 2007

(30) Foreign Application Priority Data

Dec. 22, 2004 (JP) .................................. 2004-372050
Jan. 25, 2005 (JP) .................................. 2005-017439

(51) Int. Cl.
*H04N 21/422* (2011.01)
*G08C 23/04* (2006.01)
(Continued)

(52) U.S. Cl.
CPC ....... *H04N 21/42209* (2013.01); *G08C 23/04* (2013.01); *H04B 1/205* (2013.01);
(Continued)

(58) Field of Classification Search
CPC ............. H04N 21/43615; H04N 7/163; H04N 21/4622; H04N 21/482; H04N 21/42204;
(Continued)

(56) References Cited

U.S. PATENT DOCUMENTS 5,544,315 A * 8/1996 Lehfeldt ................. H04L 29/06
340/286.02
5,557,724 A * 9/1996 Sampat ............... H04L 12/1859
348/E5.105
(Continued)

FOREIGN PATENT DOCUMENTS

EP   1 182 871 A2   2/2002
JP   07-044291 A    2/1995
(Continued)

OTHER PUBLICATIONS

PCT International Search Report for PCT/JP2005/022340 dated Mar. 20, 2006.
(Continued)

*Primary Examiner* — James J Yang
(74) *Attorney, Agent, or Firm* — Michael Best & Friedrich LLP

(57) ABSTRACT

A communication medium with fewer limitations on the directivity or available communication range, such as an IP network, is used to perform a remote control operation. Since two-way communication can be carried out between a remote controller and a device to be operated, it is possible to provide more reliable communication by means of a delivery confirmation, to handle a GUI-based complex command scheme, and to provide large-volume data transmission, such as moving-image streaming, using relatively broad bands. A television receiver to be operated by the remote controller distributes moving-image data, such as a
(Continued)

child view, to an IP remote controller through an IP network so that the data can be viewed on the IP remote controller.

35 Claims, 21 Drawing Sheets

(51) Int. Cl.
*H04N 5/44* (2011.01)
*H04N 7/16* (2011.01)
*H04N 21/4227* (2011.01)
*H04N 21/431* (2011.01)
*H04N 21/436* (2011.01)
*H04N 21/482* (2011.01)
*H04N 21/643* (2011.01)
*H04B 1/20* (2006.01)
*H04N 21/6587* (2011.01)
*H04L 12/28* (2006.01)

(52) U.S. Cl.
CPC ........... *H04N 5/4403* (2013.01); *H04N 7/163* (2013.01); *H04N 21/4227* (2013.01); *H04N 21/4316* (2013.01); *H04N 21/43615* (2013.01); *H04N 21/482* (2013.01); *H04N 21/64322* (2013.01); *H04N 21/6587* (2013.01); *G08C 2201/50* (2013.01); *H04L 12/282* (2013.01); *H04L 2012/2849* (2013.01); *H04N 2005/441* (2013.01); *H04N 2005/4433* (2013.01)

(58) Field of Classification Search
CPC .......... H04N 7/17318; H04N 5/44543; H04N 21/47202; H04L 2012/2849; H04L 12/282
USPC .................. 340/1.1, 4.3, 4.32–4.34, 4.11
See application file for complete search history.

(56) References Cited

U.S. PATENT DOCUMENTS

| | | | | |
|---|---|---|---|---|
| 5,687,334 | A * | 11/1997 | Davis et al. ................... | 715/764 |
| 5,740,075 | A * | 4/1998 | Bigham .................. | H04L 12/66 340/1.1 |
| 5,801,689 | A | 9/1998 | Huntsman | |
| 5,887,193 | A | 3/1999 | Takahashi et al. | |
| 6,133,847 | A * | 10/2000 | Yang .......................... | 340/12.25 |
| 6,806,885 | B1 | 11/2004 | Zimmerman | |
| 6,816,129 | B1 * | 11/2004 | Zimmerman ......... | G06F 3/1431 340/1.1 |
| 7,018,043 | B2 * | 3/2006 | Castaldi et al. ................ | 353/30 |
| 7,117,043 | B1 | 10/2006 | Frederick et al. | |
| 7,119,710 | B2 * | 10/2006 | Hayes et al. ............... | 340/12.28 |
| 7,126,468 | B2 * | 10/2006 | Arling et al. .............. | 340/539.1 |
| 2002/0023266 | A1 | 2/2002 | Kawana et al. | |
| 2002/0129374 | A1 * | 9/2002 | Freeman ................ | H04H 20/12 725/91 |
| 2002/0174270 | A1 * | 11/2002 | Stecyk ................ | H04L 12/2805 710/1 |
| 2003/0103088 | A1 | 6/2003 | Drestl et al. | |
| 2003/0195669 | A1 * | 10/2003 | Sakurai et al. ................... | 701/1 |
| 2003/0195969 | A1 * | 10/2003 | Neuman ............. | H04L 12/2803 709/229 |
| 2004/0066377 | A1 | 4/2004 | Ha | |
| 2004/0108940 | A1 * | 6/2004 | Witkow et al. .......... | 340/825.25 |
| 2004/0128694 | A1 * | 7/2004 | Bantz ................... | H04N 5/4401 725/95 |
| 2005/0097610 | A1 * | 5/2005 | Pedlow, Jr. .............. | H04N 7/16 725/80 |
| 2006/0129658 | A1 * | 6/2006 | Kawai .......................... | 709/220 |

FOREIGN PATENT DOCUMENTS

| | | |
|---|---|---|
| JP | 11-284757 A | 10/1999 |
| JP | 2001-223955 A | 8/2001 |
| JP | 2002-034023 A | 1/2002 |
| JP | 2002-064768 A | 2/2002 |
| JP | 2002-165281 A | 6/2002 |
| JP | 2003-143670 A | 5/2003 |
| JP | 2003-259464 A | 9/2003 |
| JP | 2003-304477 A | 10/2003 |
| JP | 2004-040656 A | 2/2004 |
| JP | 2004-120652 A | 4/2004 |
| JP | 2004-120713 A | 4/2004 |
| JP | 2004-221779 A | 8/2004 |
| JP | 2004-295375 A | 10/2004 |
| JP | 2004-336722 A | 11/2004 |
| JP | 2005-532005 A | 10/2005 |
| JP | 2011-139117 A | 7/2011 |
| JP | 2012-114956 A | 6/2012 |
| WO | WO-00/04709 A1 | 1/2000 |
| WO | WO 0004709 A1 * | 1/2000 |
| WO | WO 0076130 A1 * | 12/2000 |
| WO | WO-0076130 A1 * | 12/2000 ......... H04L 12/2805 |
| WO | WO-2004/006568 A1 | 1/2004 |

OTHER PUBLICATIONS

Japanese Office Action dated Jun. 30, 2008 for corresponding Japanese Application No. 2005-017439.
European Patent Office Communication Pursuant to Article 94(3) EPC dated Aug. 6, 2010 for corresponding European Application No. 05 814 133.4-2202.
Anonymous, "The HAVi Specification" HAVI, Inc., May 15, 2001, Retrieved from the Internet: URL: www.havi.org/HAVI_1.1.pdf [retrieved Aug. 23, 2010] pp. 1-124, 166-167.
"1394a-2000 IEEE Standard for a High Performance Serial Bus-Amendment 1" Dec. 12, 2000, retrieved from the Internet: URL:http:// ieeexplore.ieee.org/ stamp/stamp.jsp?tp=&arnumber=853984 [retrieved on Jul. 23, 2010] pp. 20-23.
Extended European Search Report dated Sep. 17, 2009 for corresponding European Application No. 05 81 4133.
Japanese Office Action dated Sep. 13, 2011 for related Japanese Application No. 2008-227963.
Japanese Office Action dated Aug. 20, 2013 for corresponding Japanese Application No. 2012-048365.
Japanese Office Action dated Nov. 25, 2014 for corresponding Japanese Application No. 2014-043535.
Japanese Office Action dated Feb. 10, 2015 for corresponding Japanese Application No. 2014-043535.

* cited by examiner

REMOTE CONTROL SYSTEM, REMOTE CONTROL COMMANDER, REMOTE CONTROL SERVER

TECHNICAL FIELD

The present invention relates to a remote control system, a remote commander, and a remote control server for remotely operating a television receiver, a DVD player, and various other devices, such as an AV device, a CE device, and an information device, by using a remote commander, and more particularly, to a remote control system, a remote commander, and a remote control server for realizing remote control free from limitations on the directivity or available transmission distance from the remote commander to a device to be operated.

More specifically, the present invention relates to a remote control system, a remote commander, and a remote control server for providing two-way communication between the remote commander and a device to be operated using a network such as TCP/IP, and more particularly, to a remote control system, a remote commander, and a remote control server for remotely controlling a device in front of the user's eyes as a device to be operated from a plurality of devices without limitations on the directivity or available transmission distance.

BACKGROUND ART

To date, various information appliances and home electric appliances, such as television receivers, video recording and playback devices, and audio-visual devices, have been developed and manufactured, and have been widely used in houses and other living spaces. Basically, such information devices are directly operated through user interfaces generally provided for the device main body, such as operation buttons and volume switches. Recently, however, almost all devices can be remotely operated using remote controllers.

For example, in the field of consumer electrical and electronic devices, such as home electrical products, "infrared remote controllers" using an AM modulation method as means for inputting user operation commands to the devices in a remote manner have been developed and have already been established.

Such a communication method using infrared light has advantages of low cost, low power consumption, substantially no legal restrictions in countries, and so forth. Elimination of hard-wired cabling also means that connectors for connecting cables are not necessary, leading to reduction in cost. There is no concern of mechanical exhaustion caused by inserting and removing connectors each time connection or disconnection occurs.

The communication method using infrared light, however, has a problem of directivity. Communication is not established unless a light-receiving unit of a receiver is set within the angle of view of a transmitter, which imposes a large limitation in use (see, for example, Patent Document 1). Further, the infrared communication method basically provides one-way communication, and has a problem that a transmission source is not able to receive a response from the other party and is not able to make a delivery confirmation.

It is possible to carry out two-way communication if both devices that are to perform communication are provided with an infrared transmission function and an infrared reception function. In infrared communication, however, due to the problem of directivity, users of both devices are inconvenienced by having to direct their devices to the other devices to perform transmission operations.

For example, a communication device that relays an infrared operation signal for an electronic device, which is emitted from a remote commander, to operate an electronic device located at a place where an infrared operation signal from a dedicated remote controller does not directly reach has been proposed (see, for example, Patent Document 2). This communication device extracts a pulse waveform component by removing a carrier component from the infrared operation signal received from the remote commander, and transmits the pulse waveform component through a network. The communication device also modulates an infrared carrier by the pulse waveform component, and transmits the modulated infrared carrier to the electronic device to be operated.

A remote operation system that is constructed with a simple device configuration in which no relay device or the like is used has been proposed (see, for example, Patent Document 3). A controller transmits capability information indicating the capability of input operations that can be performed by the controller to a device to be controlled, and the device to be controlled creates and returns remote-controller handling information for forming a user interface that can be realized within the range of the received capability information. The controller forms a user interface using the remote-controller handling information.

In the infrared communication method, however, due to the limited communication bandwidth, it is difficult to exchange a large amount of data such as moving pictures or still images, and the function of a terminal device for performing remote control is limited.

Further, a mobile-phone remote control system for allowing a reservation to be set in devices, such as home electric appliances, by using a mobile phone has been proposed (see, for example, Patent Document 4). According to this system, a remote controller receives a signal from a mobile phone, and optically transmits a remote control signal for remotely controlling a device to be controlled according to the received signal.

In the remote control system using a network, a mobile telephone network, or the like, a remote operation itself is possible; however, limitations on the communication bandwidth are still imposed, as in a standard remote control system, because the infrared communication method is adopted in the final stage in remote control.

[Patent Document 1]
Japanese Unexamined Patent Application Publication No. 2002-165281
[Patent Document 2]
Japanese Unexamined Patent Application Publication No. 2003-258464
[Patent Document 3]
Japanese Unexamined Patent Application Publication No. 2003-143670
[Patent Document 4]
Japanese Unexamined Patent Application Publication No. 11-284757

DISCLOSURE OF INVENTION

Problems to be Solved by the Invention

It is an object of the present invention to provide a superior remote control system, a superior remote commander, and a superior remote control server, in which a television receiver, a DVD player, and various other devices, such as an AV device, a CE device, and an information device, can suitably be operated remotely by using a remote commander.

It is another object of the present invention to provide a superior remote control system, a superior remote commander, and a superior remote control server, in which remote control free from limitations on the directivity or available transmission distance from the remote commander to a device to be operated can be realized.

It is another object of the present invention to provide a superior remote control system, a superior remote commander, and a superior remote control server, in which two-way communication between the remote commander and a device to be operated can be carried out using a network such as TCP/IP.

It is another object of the present invention to provide a superior remote control system, a superior remote commander, and a superior remote control server, in which a device in front of the user's eyes can be specified as a device to be operated from a plurality of devices without limitations on the directivity or available transmission distance and can be remotely controlled.

Means for Solving the Problems

The present invention has been made in view of the above-mentioned programs, and provides a remote control system in which a remote commander is used to operate one or more devices to be controlled, wherein the remote commander and at least some of the devices to be controlled are provided with a network communication function, and a device to be controlled is operated by means of a command through a network in response to a user input on the remote commander.

The term "system" as used herein refers to a logical collection of a plurality of apparatuses (or function modules achieving a specific function) regardless of whether or not the apparatuses or function modules are housed in a single housing (the same applies to the following description).

In the remote control system according to the present invention, the device to be controlled returns a response through the network in response to a command transmitted by the remote commander through the network.

Further, the remote commander submits a request for data to the device to be controlled, and the device to be controlled returns the requested data through the network. Then, the remote commander decodes the data received from the device to be controlled to play back and output the data.

To date, a communication method using infrared light has been widely used to remotely operate devices. The communication method using infrared light has advantages of low cost, low power consumption, substantially no legal restrictions in countries, and so forth. However, the communication method using infrared light has a problem of directivity. Communication is not established unless a light-receiving unit of a receiver is set within the angle of view of a transmitter, which imposes a large limitation in use. Further, the infrared communication method basically provides one-way communication, and a transmission source is not able to receive a response from the other party and is not able to make a delivery confirmation.

In the remote control system according to the present invention, in contrast, a communication medium with fewer limitations on the directivity or available communication range, such as an IP network, is used to perform a remote control operation.

According to such a remote control system using an IP network, two-way communication can be carried out between a remote controller and a device to be operated, and technical advantages of providing more reliable communication by means of a delivery confirmation (response), handling a GUI-based complex command scheme, and providing large-volume data transmission, such as moving-image streaming, using relatively broad bands are achieved. For example, a television receiver to be operated by the remote controller distributes moving-image data subjected to reception processing, such as a child view, to an IP remote controller through an IP network so that the child view can be viewed on a display screen of the IP remote controller.

When data is requested by the remote commander, the device to be controlled may convert the corresponding data content into a format that can be played back and output by the remote commander, and returns the converted data through the network. For example, when a request for video output of a desired television program or a request for AV output video from a device to be controlled, such as an HDD recorder, is submitted to a television receiver serving as a device to be controlled, the video data is converted into a low-bit-rate data format that can be received and played back by an IP remote controller, such as MPEG4 data, and is distributed via streaming through a LAN. However, the process for conversion into a data format that can be played back and output by the remote commander according to the present invention is not limited to conversion of bit rates, such as conversion from a high bit rate to a low bit rate.

Devices to be controlled may include an IR device that can be remotely controlled only by means of old infrared communication. In this case, a remote control server having a network communication function and a protocol conversion function of converting a command received through a network into an infrared command may be provided between the IP remote controller and the IR device. Upon receiving an operation command for the IR device from the IP remote controller through an IP network, the remote control server converts the operation command into an infrared command, and transfers the infrared command to the IR device. Therefore, the IR device can be operated by the IP remote controller.

The remote control server may extract from the IR device the data requested by the remote commander to the IR device, and may convert the extracted data into a format that can be played back and output by the remote commander to return the converted data to the remote commander through the network. For example, the remote control server converts AV output video from a recording device serving as an IR device into a low-bit-rate data format that can be received and played back by the IP remote controller; such as MPEG4 data, and distributes the converted data via streaming through a LAN.

If the device to be controlled is a television receiver, it can extract EPG data from a received broadcast wave and can store the EPG data. In this case, the EPG data may be returned through the network in response to an EPG data request from the remote commander. The remote commander displays and outputs received EPG data.

The remote commander may transmit a channel change request to a television receiver serving as a device to be controlled in response to designation of a channel on a current EPG data display view.

In response to this, the television receiver may convert video content received on the channel specified in the change request given by the remote commander into a format that can be played back and output by the remote commander, and may distribute the converted video content via streaming through the network. Then, the remote commander decodes the video content received, and displays video. The user can view a child view on the remote commander.

Further, the television receiver may change the display of the video to the channel specified in the change request given by the remote commander. This is an operation of throwing the video displayed on the remote commander onto a television screen.

Further, in response to designation of a television program on a future EPG data display view, the remote commander may transmit a request for setting a reservation to record the program to a recording device serving as a-device to be controlled.

A recording reservation from the remote commander to the recording device may be set by the intervention of a remote control server. Upon receiving a recording reservation request from the remote commander through the network, the remote control server converts the recording reservation request into infrared reservation data on the basis of EPG data, and transmits the recording reservation data via infrared light to an IR recording device that can be remotely controlled only by means of infrared communication. Then, the IR recording device sets a recording reservation according to the infrared reservation data from the remote control server.

Further, in response to a request for video content form the remote commander, a recording device serving as a device to be controlled may convert the requested video content into a format that can be played back and output by the remote commander, and may distribute the converted video content via streaming through the network. The remote commander decodes the video content received, and displays video. The user can confirm the recorded video on the remote commander without changing the video displayed on the television set.

Such an operation for recorded video on the remote commander may be performed by the intervention of a remote control server. Upon receiving a video content request from the remote commander through the network, the remote control server converts the video content request into an infrared command, and transmits the video content request via infrared light to an IR recording device that can be remotely controlled only by means of infrared communication. In response to this, the IR recording device outputs video content according to the infrared command from the remote control server. Then, the remote control server converts the video content output from the IR recording device into a format that can be played back and output by the remote commander, and distributes the converted video content to the remote commander via streaming through the network.

The remote commander can request a display device serving as a device to be controlled to change the display of the video to video content currently being displayed on the remote commander. In response to the request to change the display of the video, for example, the display device changes the screen from video received by a television set to video output from a recording device. This is an operation of throwing the video displayed on the remote commander onto a television screen.

Further, the remote commander may submit a request for device information to devices to be controlled having a network communication function through the network at the turn-on time or any other timing. Then, a device list concerning a device to be controlled that has responded with device information in response to the request is displayed. A device to be controlled that responded with device information in the past and that does not respond at present may be displayed in a grayed-out manner on the device list. Alternatively, a device to be controlled that has not responded with device information for a certain period of time or more may be deleted from the device list.

The remote commander can transmit an operation request to a device to be controlled selected on the device list. When the device to be controlled, displayed in a grayed-out manner on the device list, is selected, an operation request may be transmitted after a request for turning on the device to be controlled is submitted.

Further, the remote control server may pre-register therein information on IR devices to which the infrared command can be transmitted, and may return IR device information to the remote commander in response to a request from the remote commander.

In this case, the remote commander displays an IR device list. Then, the remote commander can transmit an operation request for an IR device selected on the IR device list to the remote control server through the network. In response to this, the remote control server converts the operation request for the IR device from the remote commander into an infrared command, and transfers the converted infrared command to the IR device.

Advantages

According to the present invention, a superior remote control system, remote control method, remote commander, and electronic device in which a television receiver, a DVD player, and various other devices, such as an AV device, a CE device, and an information device, can suitably be operated remotely by using a remote commander can be provided.

Further, according to the present invention, a superior remote control system, remote commander, and remote control server in which remote control free from limitations on the directivity or available transmission distance from a remote commander to a device to be operated can be realized.

Further, according to the present invention, a superior remote control system, remote commander, and remote control server in which two-way communication between the remote commander and a device to be operated can be carried out using a network, such as TCP/IP, can be provided.

Further, according to the present invention, a superior remote control system, remote commander, and remote control server in which a device in front of the user's eyes can be specified as a device to be operated from a plurality of devices without limitations on the directivity or available transmission distance and can be remotely controlled can be provided.

Other objects, features, and advantages of the present invention will become apparent from the following embodiments of the present invention and more detailed description with reference to the accompanying drawings.

REFERENCE NUMERALS

Figure 1:
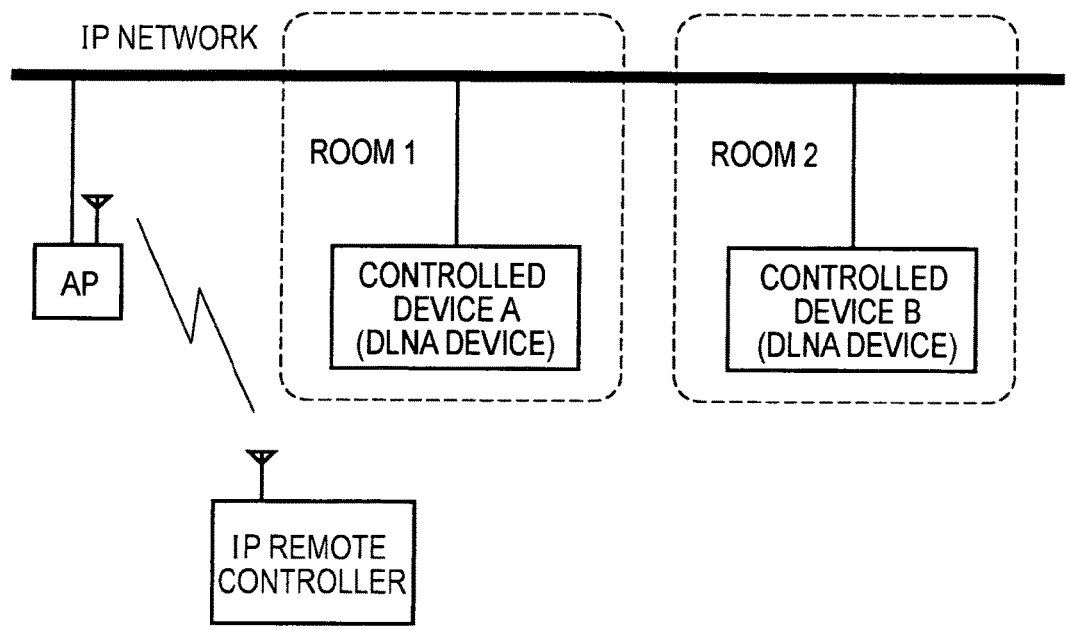
FIG. 1 is a diagram schematically showing an example structure of a remote control system according to an embodiment of the present invention.

11 CPU
12 bus
13 memory device
14 input switch matrix unit
15 network communication unit
16 infrared communication unit
17 codec processing unit
18 graphic display processor
19 liquid crystal display unit
20 data input/output interface
31 CPU
32 bus
33 memory device
34 wired LAN unit
35 infrared processing unit
37 codec processing unit
38 HDD

BEST MODE FOR CARRYING OUT THE INVENTION

An embodiment of the present invention will be described in detail hereinafter with reference to the drawings.

The present invention relates to a remote control system in which a television receiver, a DVD player, and various other devices, such as an AV device, a CE device, and an information device, are remotely operated by using a remote commander.

A communication method using infrared light, that is, an infrared remote controller, is generally used for remote control of devices. However, due to the problem of directivity, communication is not established unless a light-receiving unit of a receiver is set within the angle of view of a transmitter, which imposes a large limitation in use. Further, the infrared communication method basically provides one-way communication, and a transmission source is not able to receive a response from the other party, and is not able to make a delivery confirmation.

In the present invention, therefore, a remote control system using a remote commander based on an IP network instead of an infrared transmission path, i.e., an IP remote controller, is constructed. The IP remote controller provides remote control using a communication medium with fewer constraints on the directivity or available communication range. Further, on an IP network, two-way communication can be carried out between the remote controller and a device to be operated, and technical advantages of providing more reliable communication by means of a delivery confirmation (response), handling a GUI-based complex command scheme, and providing large-volume data transmission, such as moving-image streaming, using relatively broad bands are achieved. For example, a television receiver to be operated by a remote controller distributes moving-image data subjected to reception processing, such as a child view, to an IP remote controller through an IP network so that the child view can be viewed on a display screen of the IP remote controller.

Since an IP remote controller for controlling a device on a network is non-directional, or permeable, there arises a problem that a particular device in front of the user's eyes cannot be designated and operated as a target. On account of this, remote control is performed using a TCP/IP network. An infrared remote control function of the related art may also be used to specify a device.

A. System Configuration

FIG. 1 schematically shows an example structure of a remote control system according to an embodiment of the present invention. The system shown in FIG. 1 includes an IP remote controller used by a user to operate devices, and controlled devices A and B to be operated by the IP remote controller. The controlled devices A and B are located in different rooms 1 and 2, respectively, and both devices do not simultaneously reside in an area where infrared light reaches.

The controlled devices A and B include, for example, a television receiver, a DVD player, and various other devices, such as an AV device, a CE device, and an information device, and are each provided with a function of receiving an infrared command and a network interface. The controlled devices A and B are connected to each other via an IP network (LAN) established under IEEE 802.3 (ETHERNET™ (registered trademark)) or the like.

An example of controlled devices that can be operated by means of commands from the IP remote controller through a network is a home electric appliance compatible with the DLNA (Digital Living Network Alliance) guidelines, and is hereinafter also referred to as a "DLNA device".

The IP remote controller has a function of transmitting an infrared command in accordance with a user's operation and a wireless network interface, and is capable of communicating with an access point (AP) through a wireless network established under IEEE 802.11a/b or the like. Since the AP is connected to the IP network, the IP remote controller can perform two-way communication with the controlled devices A and B over the AP to transmit a remote control command or receive data from the controlled devices A and B through the IP network.

The IP remote controller may further include a display, such as an LCD, and may play back and output moving-image data distributed via streaming from the controlled devices A and B through the IP network (discussed below).

Figure 2:
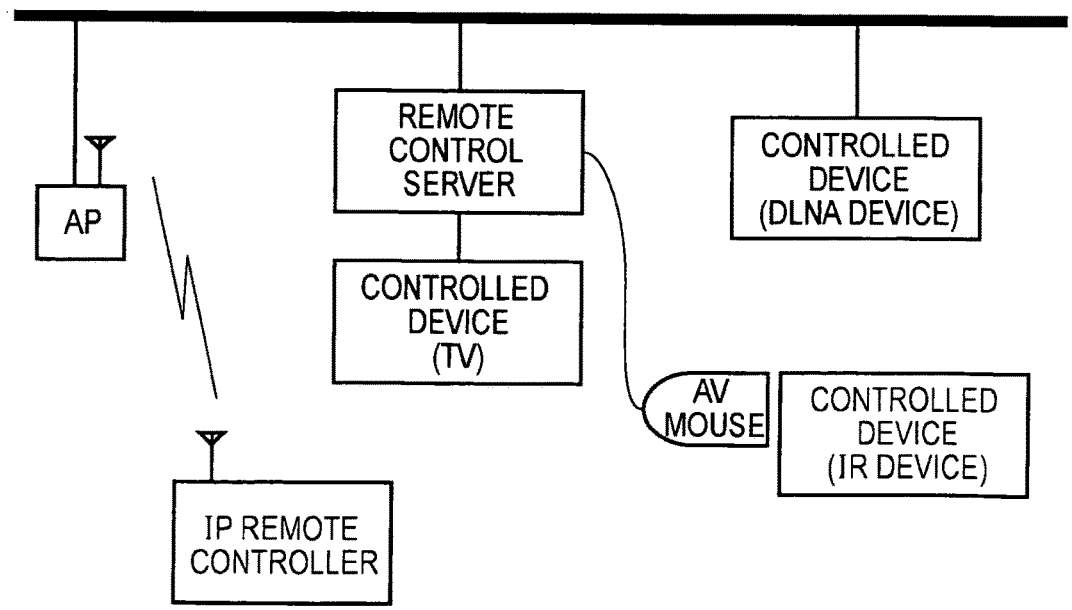
FIG. 2 is a diagram showing a remote control system according to another embodiment of the present invention.

FIG. 2 shows a remote control system according to another embodiment of the present invention. A major difference from the system configuration shown in FIG. 1 is the intervention of a remote control server between an IP remote controller and a device to be controlled.

The remote control server is used by connecting it to a main DLNA device to be controlled by the IP remote controller, such as a television receiver, or, alternatively, is integrally formed with this type of DLNA device.

The remote control server has a wired LAN communication function, such as ETHERNET™, and receives a command from the IP remote controller through the IP network, i.e., the LAN, to transfer an operation command to a device to be controlled by the IP remote controller. If the device to be controlled also has a LAN communication function, the remote control server transfers through the LAN an operation command received from the IP remote controller.

Further, for the benefit of a device to be controlled without a LAN communication function, which can be remotely operated only by an old (legacy) infrared (IR) remote control method (the device to be controlled is hereinafter also referred to as an "IR device"), the remote control server converts an operation command received from the IP remote controller through the LAN into a command format for use in infrared communication such as SIRCS, and performs optical transmission. For transmission of an infrared command, if the IR device to be controlled is in a dead angle from the remote control server or the distance therebetween is long, an extension cord, such as an AV mouse, may be used to optically transmit the infrared command in the vicinity of the IR device. The AV mouse is disclosed in, for example, Japanese Unexamined Patent Application Publication No. 2001-223955, which has been assigned to the present applicant.

When the remote control server is connected to a television receiver or any other source device of AV content or is integrally formed therewith, the remote control server can also function as a distribution server that distributes the AV content (or any other form of content) to the IP remote controller.

For example, when the remote control server is connected to a television receiver, received audio and video signals are subjected to AV codec conversion into a low-bit-rate data format that can be received and played back by the IP remote controller, such as MPEG4 data, and are then distributed to the IP remote controller via streaming through the LAN. Alternatively, recorded content recorded at a high bit rate, such as MPEG1 or MPEG2 content, is loaded from an HDD recorder connected through the LAN, is subjected to AV codec conversion into a low-bit-rate data format that can be received and played back by the IP remote controller, such as MPEG4 data, and is then distributed to the IP remote controller via streaming through the LAN. Conversion of bit rates, such as, but not limited to, conversion from a high bit rate to a low bit rate, is an example of the process for conversion into a data format that can be played back and output by the IP remote controller.

Figure 3:
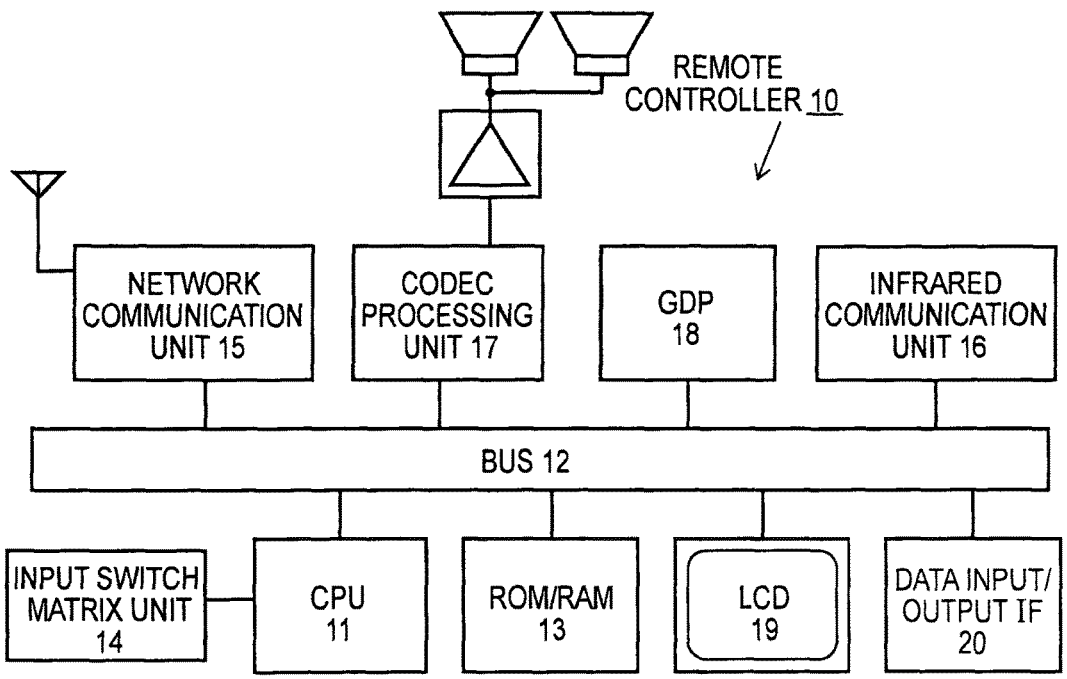
FIG. 3 is a diagram showing an example hardware configuration of a terminal device capable of operating as an IP remote controller.

FIG. 3 shows an example hardware configuration of a terminal device capable of operating as the IP remote controller in the remote control system according to the present embodiment. The terminal device shown in FIG. 3 may be manufactured as a dedicated terminal for the IP remote controller, or can be designed to also function as another portable terminal, such as a PDA (Personal Digital Assistant) or a game device.

An IP remote controller 10 shown in FIG. 3 is configured such that a CPU (Central Processing Unit) 11 generally controls the respective parts via a bus 12.

The CPU 11 is provided with a memory device 13 including a ROM and a RAM, and loads program code stored in the ROM onto the RAM to perform a predetermined process. The predetermined process includes operations, such as transmission and reception of a command/response of a control signal to and from a device to be controlled through a network, transmission and reception of content to and from the device to be controlled, file transfer, and remote operation of a device to be controlled, such as a DLNA device or an IR device, and these operations are executed according to an operation input from a user. The details of the operations are discussed below.

An input switch matrix unit 14 includes a key operation unit including keys, such as a ten-key pad, an audio adjustment key, an image quality adjustment key, and a channel selection key, and is operated to input the contents of an operation to be performed on a device to be remotely controlled by a user. A controlled-device operating command input by the input switch matrix unit 14 is transmitted from a network communication unit 15 through an IP network.

The network communication unit 15 is provided with a network interface for communicating with an access point (AP) through a wireless network established under, for example, IEEE 802.11a/b or the like. The network communication unit 15 is assigned identification information unique on the network, such as a MAC address or an IP address. In the present embodiment, the network communication unit 15 is configured to transfer a remote control request in accordance with an instruction given by the input switch matrix unit 14 to a device to be controlled through the network.

An infrared communication unit 16 is configured to transmit as an infrared signal a device search request for specifying a device in front of the eyes of the user who is an owner of the IP remote controller. The infrared communication unit 16 may also be provided with a function for transmitting a standard infrared command with the use of SIRCS (Serial Infrared Remote Control System), which is an infrared communication standard widely used for remote controllers for AV devices and so forth.

A codec processing unit 17 performs encoding and decoding of AV content. In the present embodiment, AV content received by the network communication unit 15 from a device to be controlled, such as MPEG4 content, can be decoded to play back and output audio and video. For example, a television receiver to be operated by the remote controller distributes moving-image data subjected to reception processing, such as a child view, to the IP remote controller through the IP network so that the child view can be viewed on a display screen of the IP remote controller. In a case where AV content is not transmitted from the IP remote controller, the encoding function of the codec processing unit 17 is not essential.

A graphic display processor (GDP) 18 processes graphic data to be displayed and outputted to a liquid crystal display unit (LCD) 19, and controls the driving of the LCD 19. For example, a video signal decoded by the codec processing unit 17 is displayed and output from a screen of the LCD 19 by the GDP 18. Further, based on device information obtained from a device to be controlled connected to the network, a user interface for operating the device to be controlled is displayed and output on the LCD 19.

The IP remote controller further includes a data input/output interface 20 formed of a wired interface, such as USB (Universal Serial Bus), a slot for a memory card, or the like. AV content transferred through the USB interface or AV content stored in the memory card can be decoded by the codec processing unit 17 to play back and output data. Alternatively, data processed on the IP remote controller can be encoded by the codec processing unit 17 to transfer the data from the USB interface or write it in the memory card.

Figure 4:
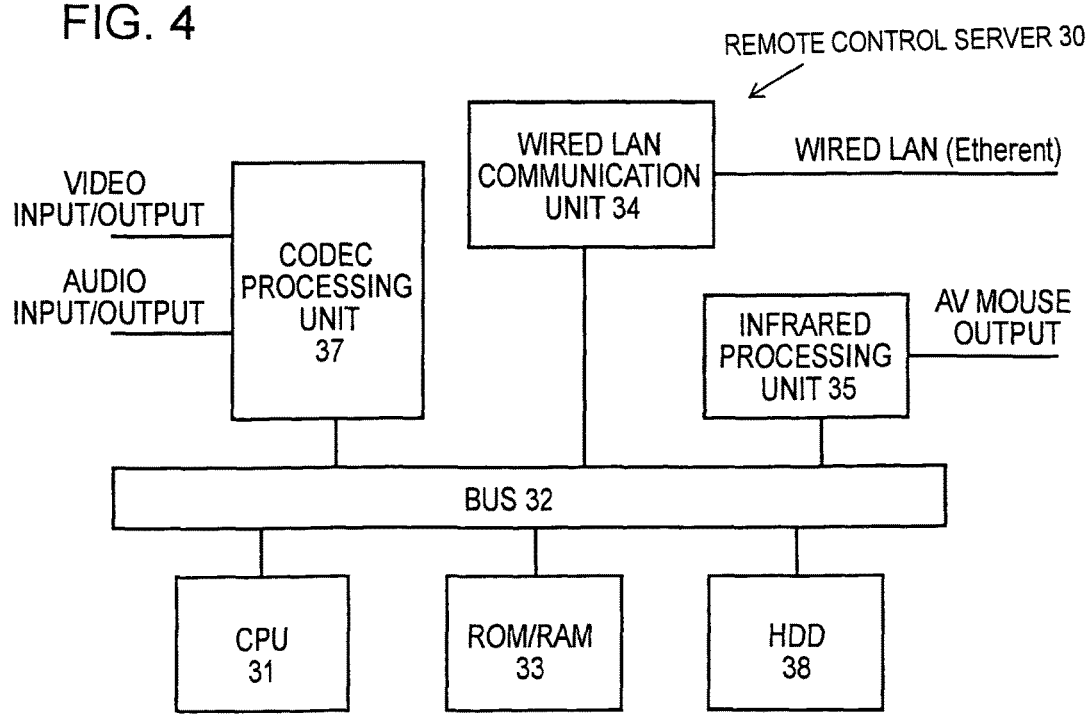
FIG. 4 is a diagram schematically showing a structure of an apparatus operating as a remote control server.

FIG. 4 schematically shows a structure of an apparatus operating as the remote control server in the remote control system according to the present embodiment. The remote control server is used by connecting it to a main AV device to be controlled by the IP remote controller, such as a television receiver, or, alternatively, is integrally formed with this type of AV device.

A remote control server 30 shown in FIG. 4 is configured such that a CPU 31 generally controls the respective parts via a bus 32.

The CPU 31 is provided with a memory device 33 including a ROM and a RAM, and loads program code stored in the ROM onto the RAM to perform a predetermined process.

The remote control server 30 includes a wired LAN communication unit 34, such as ETHERNET™, and receives a command from the IP remote controller through the LAN and the AP to perform processing on the operation command.

The remote control server 30 further includes an infrared processing unit 35. For the benefit of an IR device that can be operated only by an old infrared remote control method, the infrared processing unit 35 converts an operation command received from the IP remote controller through the LAN into a command format for use in infrared communication such as SIRCS, and performs optical transmission by means of infrared light. If the legacy controlled device is in a dead angle from the remote control server or the distance therebetween is long, an infrared command is output to an AV mouse so that the infrared command is optically transmitted in the vicinity of the legacy controlled device through output.

A codec processing unit 37 performs encoding and decoding of AV content. In the present embodiment, the codec processing unit 37 is provided with input terminals for audio and video signals, and encodes audio and video signals input from a device to be controlled, such as a television receiver or an analog video recorder, into a data format that can be played back on the IP remote controller, such as MPEG4 data, to distribute the encoded data to the IP remote controller through the IP network. Alternatively, the codec processing unit 37 loads recorded content recorded at a high bit rate, such as MPEG1 or MPEG2 content, from an HDD recorder serving as a device to be controlled through the LAN, converts it into a low-bit-rate data format that can be received and played back by the IP remote controller, such as MPEG4 data, and distributes the converted data via streaming through the LAN.

The remote control server 30 may further include a large-capacity storage device 38, such as an HDD, for storing encoded or decoded AV content, EPG data separated from a received broadcast wave, and a large volume of other data. However, the HDD 38 is not essential to the remote control server 30.

B. Functionality of Remote Control System

According to a remote control system using an IP remote controller, by connecting the IP remote controller and a device to be controlled through a network, communication operations, such as communication of a control signal and content and file transfer, can be performed between the IP remote controller and the device to be controlled. These communication operations are performed, thereby achieving the following basic functions:

(1) Control Signal (Command/Response)

To provide an interactive operation environment, such as reflection in the display on the remote controller or triggering the next associated operation, by transmitting a command to the device to be controlled and receiving a response (execution result) to the command;

(2) Transmission and Reception of Content

To provide a playback function that is expected as a result of control, such as displaying of network content (a moving picture or still image) on a screen of the remote controller in hand; Further, to realize a control function using meta-information of the content; (As an example, a channel is selected (a channel is changed) or a recording reservation is set using EPG information displayed in hand.)

(3) File Transfer

To install in the IP remote controller a storage device or a slot for a removable medium, such as a memory card, and to transfer the recording of the medium at the side of the IP remote controller to a content playback apparatus on the network to play it back; (As an example, a picture stored in a memory medium loaded in the remote controller is displayed on a television screen on the network.)

(4) Remote Operation

To allow a device that is not in front of the user's eyes to be operated if the device is connected to the network; (Therefore, content in a recorder located in another room or the like can be browsed.) Further, to allow the user to connect the remote controller to a home network, while away from home, to perform a similar operation to that when the user is at home;

(5) Integration of Remote Controllers

To enable mutual communication with a device to be controlled. (Therefore, device information is obtained from the device to be controlled, thus making it possible to switch to a user interface suitable for each device to be controlled and making it easy to integrate individual remote controllers for devices into a single unit.)

There are roughly two types of IP remote controllers, i.e., a type having only a control function and a type having a content playback function in addition to the control function. The former type, i.e., an inexpensive remote controller, and a highly value-added remote controller can individually be constructed. The IP remote controller shown in FIG. 3 corresponds to the latter type.

C. Highly Value-Added Function of Remote Control System Using IP Remote Controller In this section, a highly value-added function of the remote control system, which is achieved by the basic functions discussed in the previous section, will be described.

C-1. EPG Function

A so-called electronic program guide (EPG: Electrical Program Guide) system is known in which a program guide for selecting a television broadcast program is superimposed on an image signal to be transmitted and is displayed on a display device of a receiver. There are EPG systems of the VBI (Vertical Blanking Interval) type and the digital satellite type for use in digital direct satellite broadcasting (DSS: Digital Satellite System (a trademark of Hughes Communication).

Either type of EPG system provides an EPG view received by a television set on the screen, and allows a user to check a desired program on the basis of the EPG view to select a channel or set a reservation to record the program on the EPG view. A large number of broadcast services currently provide EPG.

In the remote control system according to the present embodiment, EPG data received by a television set can be used on an IP remote controller to switch television channels and further set a recording reservation on the EPG view displayed on the LCD 19 of the IP remote controller.

An operation procedure of the EPG function achieved by the remote control system according to the present embodiment will be explained with reference to FIGS. 5 to 8. It is assumed that a television set and an HDD recorder are provided as devices to be controlled by the IP remote controller. Among them, the television set is a DLNA device having a network communication function, such as ETHERNET™, while the HDD recorder is an IR device without a network communication function, which can be remotely controlled only by a SIRCS-based infrared communication method. It is also assumed that the television set is connected to or integrally formed with the remote control server (see FIG. 4) and that an operation command from the IP remote controller to the HDD recorder is received through the network and is subjected to protocol conversion by the remote control server to transfer the converted command to the HDD recorder by means of an infrared communication method. It is further assumed that the television receiver and the HDD recorder are connected through AV input/output terminals.

Figure 5:
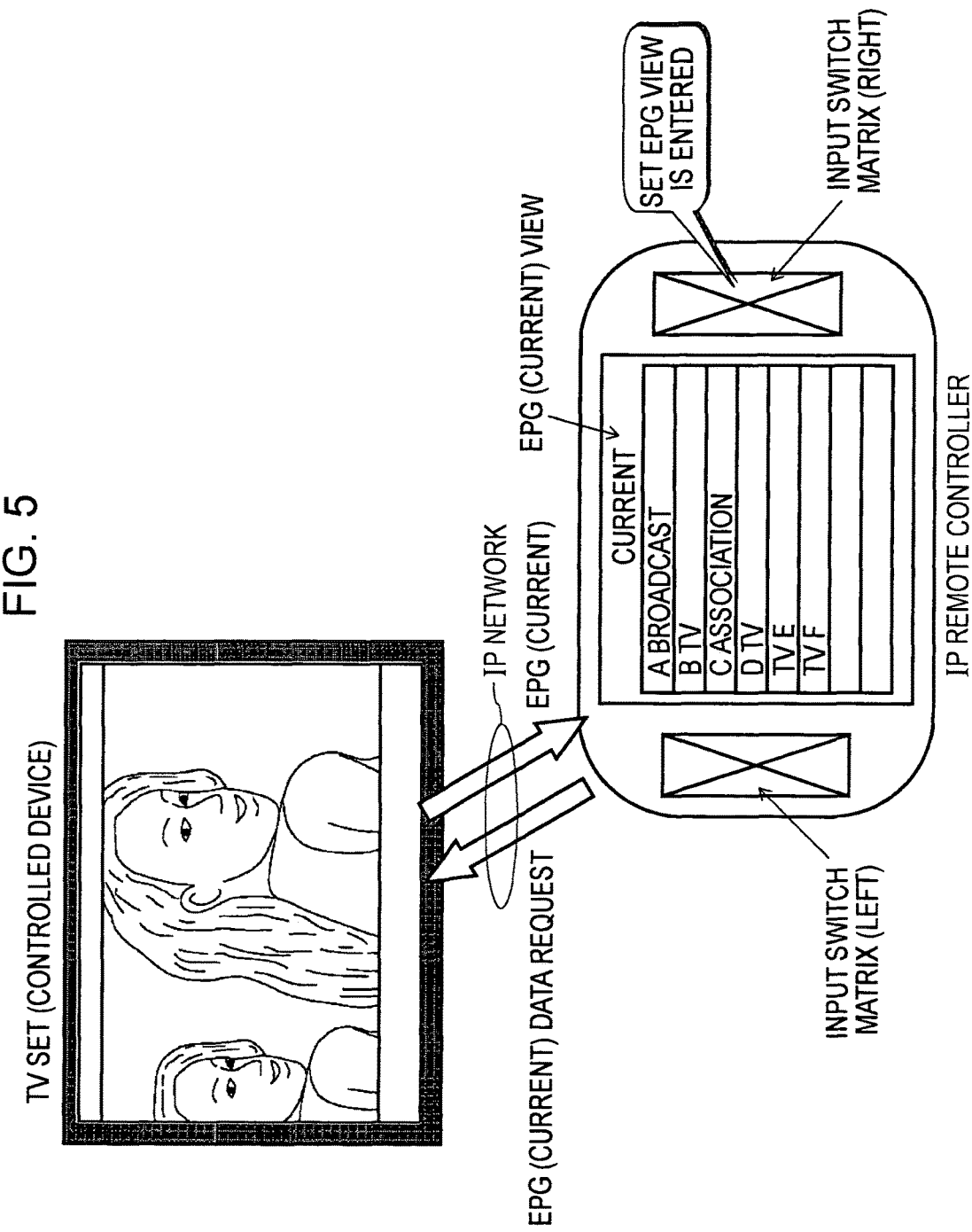
FIG. 5 is a diagram illustrating a manner in which EPG (current) data received by a television set is obtained by an IP remote controller and is displayed an LCD 19.

FIG. 5 illustrates a manner in which EPG (current) data received by the television set is obtained by the IP remote controller and is displayed on the LCD 19.

On the side of the IP remote controller, Set EPG View is entered via the input switch matrix unit 14. In response to this, a request for EPG (current) data is transmitted from the IP remote controller to the television receiver, which is a DLNA device, through the network.

On the side of the television receiver, the EPG (current) data superimposed on the received broadcast wave is separated and transferred to the IP remote controller through the network.

The EPG data is written in a structure description language, such as an XML (eXtensible Markup Language). On the side of the IP remote controller, the CPU 11 analyzes the received EPG (current) data to create an EPG view. The GDP 18 performs display processing of an EPG (current) view to display and output an EPG view on the LCD 19, as illustrated in FIG. 5.

Figure 6:
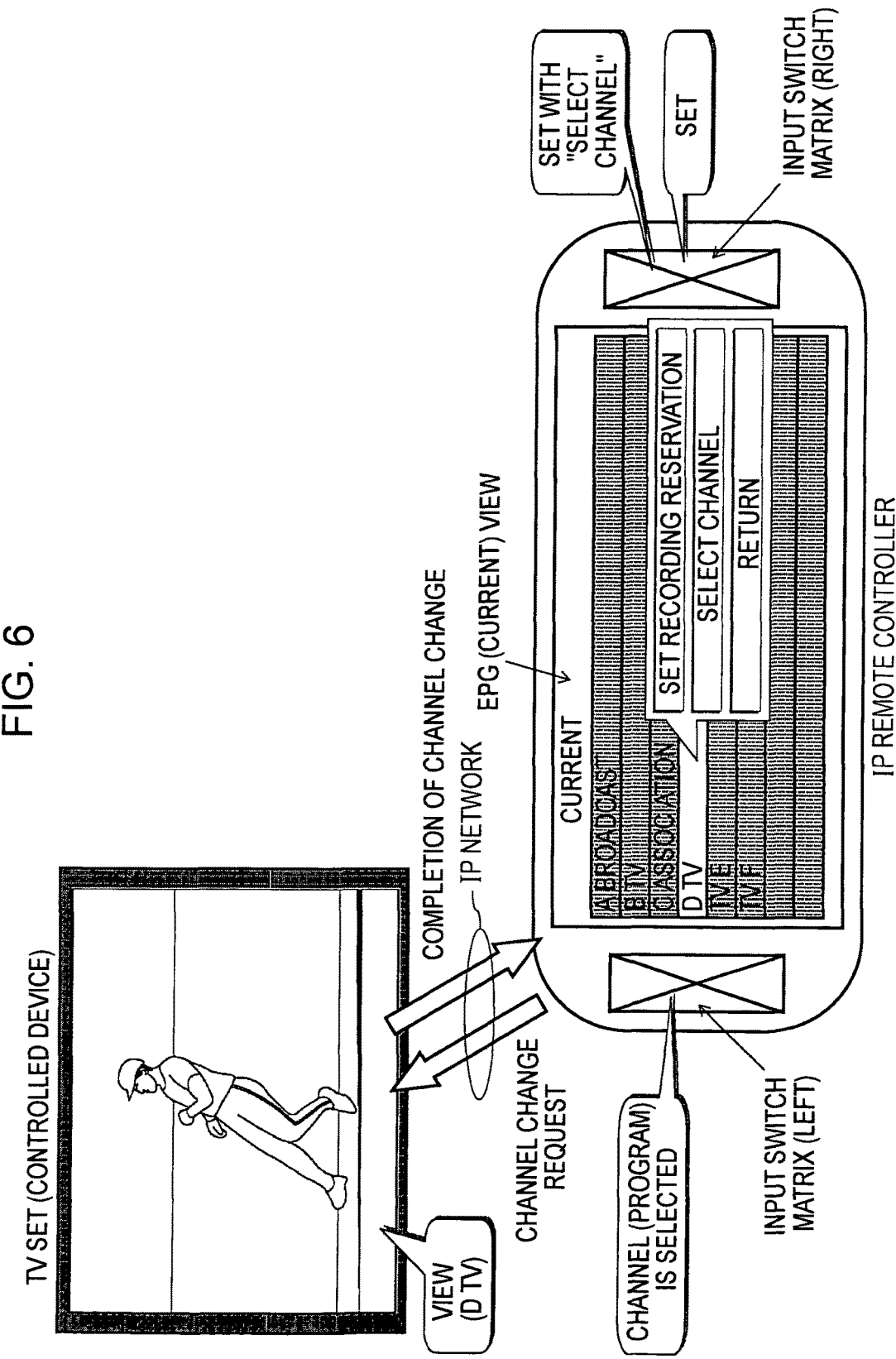
FIG. 6 is a diagram illustrating a manner in which a television channel change operation is carried out through an EPG (current) view displayed on the IP remote controller.

FIG. 6 illustrates a manner in which a television channel change operation is carried out through the EPG (current) view displayed on the IP remote controller.

On the side of the IP remote controller, the user can select a channel on the EPG (current) display view by using the input switch matrix unit 14. When selection of a channel is set, a channel change request is transmitted to the television receiver through the network.

The television receiver adjusts a tuner to the channel specified in the received channel change request. Then, the television receiver notifies the IP remote controller of completion of the channel change through the network.

Then, on the side of the IP remote controller, when a message indicating the completion of the channel change is received, the display screen of the LCD 19 is returned to the EPG (current) view.

Figure 7:
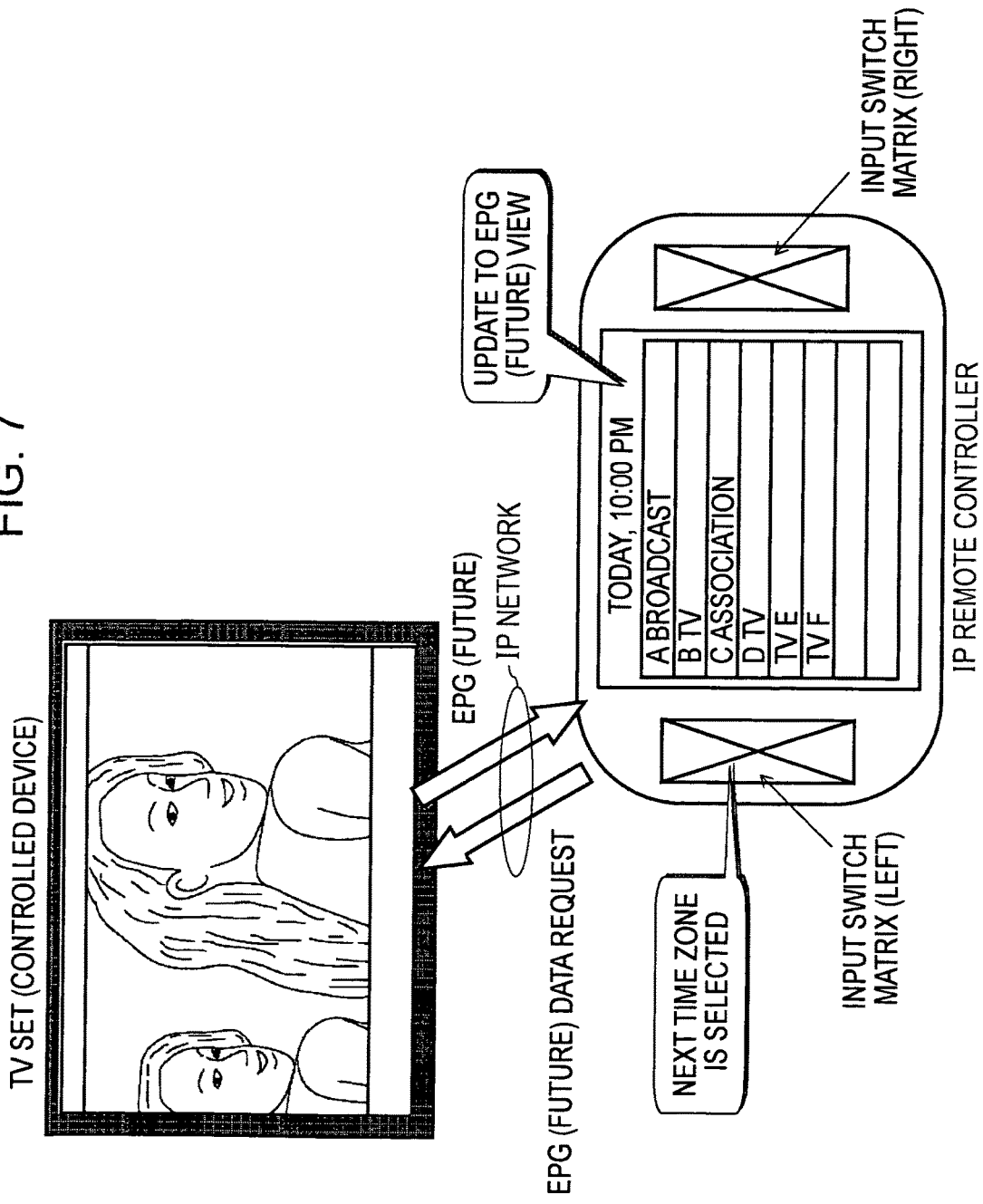
FIG. 7 is a diagram illustrating a manner in which EPG (future) data received by the television set is obtained by the IP remote controller and is displayed on the LCD 19.

FIG. 7 illustrates a manner in which EPG (future) data received by the television set is obtained by the IP remote controller and is displayed on the LCD 19.

On the side of the IP remote controller, Set EPG View is entered via the input switch matrix unit 14. In response to this, a request for EPG (future) data is transmitted from the IP remote controller to the television receiver, which is a device to be controlled, through the network.

On the side of the television receiver, the EPG (future) data superimposed on the received broadcast wave is separated and transferred to the IP remote controller through the network.

On the side of the IP remote controller, the CPU 11 analyzes the received EPG (future) data to create an EPG view. The GDP 18 performs display processing of an EPG (future) view to display and output an EPG view on the LCD 19, as illustrated in FIG. 7.

Figure 8:
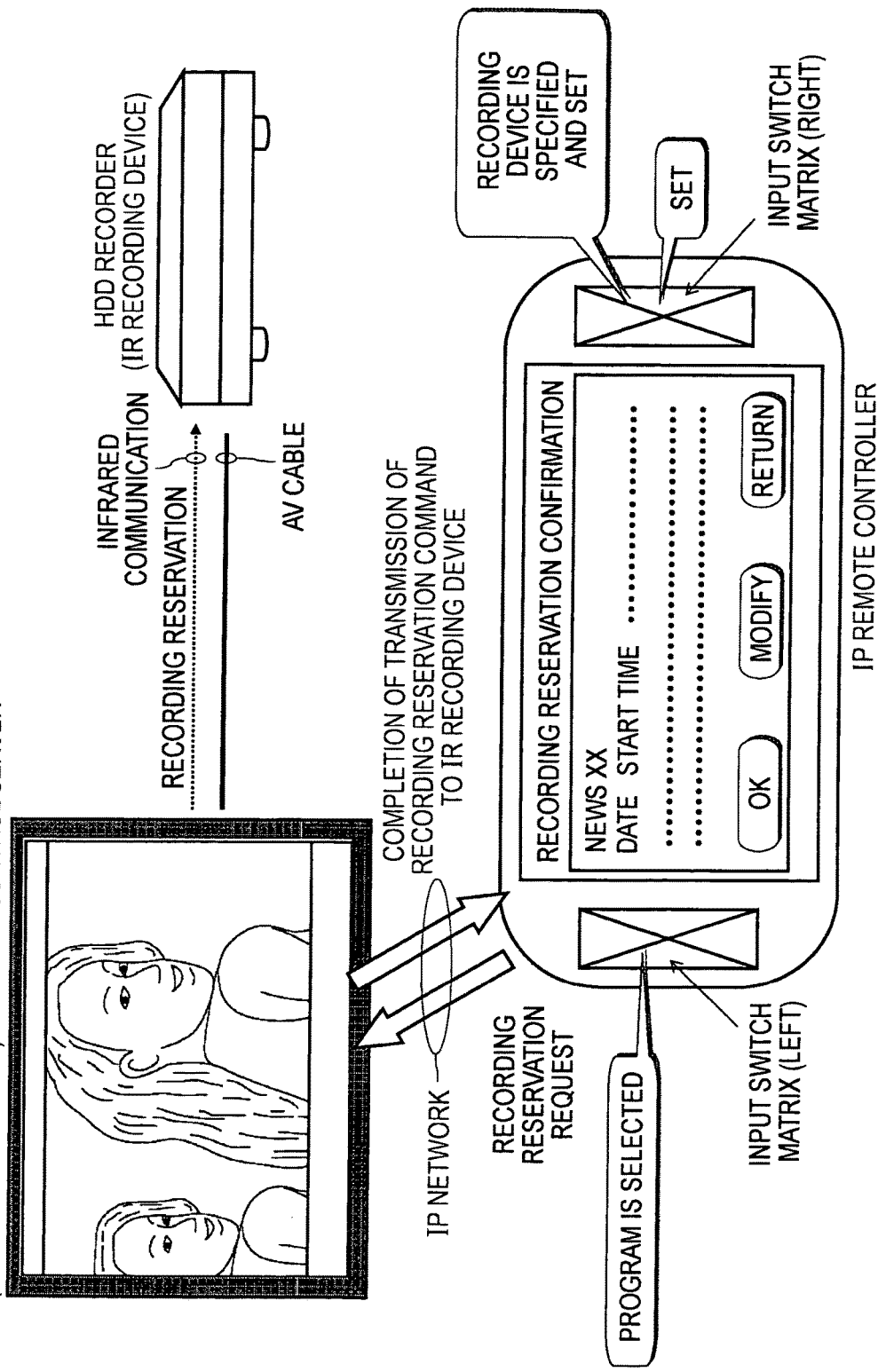
FIG. 8 is a diagram illustrating a manner in which a recording reservation of a program is set through an EPG (future) view displayed on the IP remote controller.

While the EPG (current) data provides information on the program currently broadcasted by each broadcast station, the EPG (future) data provides information concerning a recording reservation of a program. FIG. 8 illustrates a manner in which a recording reservation of a program is set through an EPG (future) view displayed on the IP remote controller.

On the side of the IP remote controller, the user can select on the EPG (future) display view a television program to be reserved for recording by using the input switch matrix unit 14. When selection of a channel is set, a request for making a reservation to record the selected television program is transmitted to the television receiver connected to the remote control server through the network.

In the illustrated example, the HDD recorder serving as a device to be controlled is an IR device that can be operated only by an old infrared remote control method. For the benefit of the HDD recorder, the remote control server converts an operation command received from the IP remote controller through the network into a command for use in infrared communication such as an SIRCS, and performs optical transmission by means of infrared light. If the IR device is in a dead angle from the remote control server or the distance therebetween is long, an infrared command may be output to an AV mouse so that the infrared command is optically transmitted in the vicinity of the IR device. Meanwhile, if the HDD recorder is near the IP remote controller so as to be directly irradiated with infrared light, the IP remote controller may transmit an SIRCS command for requesting a recording reservation from the infrared communication unit 16.

Figure 9:
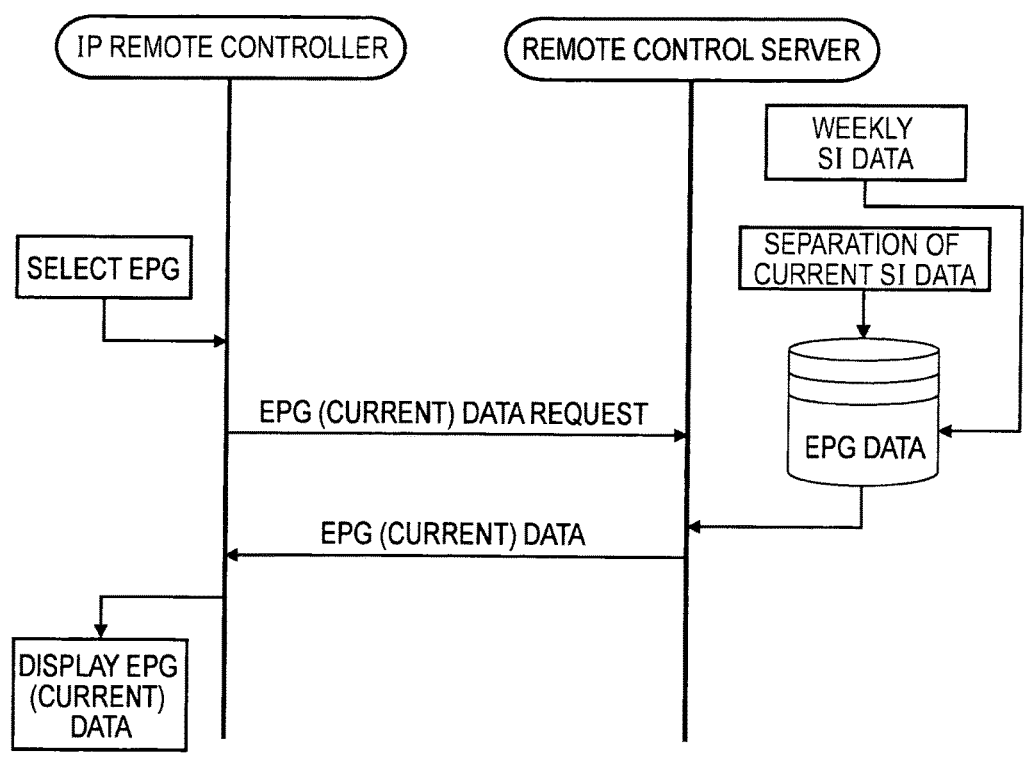
FIG. 9 is a diagram showing an operation sequence for displaying the EPG (current) data on the IP remote controller.

FIG. 9 shows an operation sequence for displaying the EPG (current) data on the IP remote controller.

The remote control server connected to the television receiver stores weekly SI (Service Information) data as EPG data. Current SI data superimposed on a received broadcast wave is separated and is stored as EPG data.

On the side of the IP remote controller, Set EPG View is entered via the input switch matrix unit 14. In response to this, a request for EPG (current) data is transmitted from the IP remote controller to the television receiver, which is a DLNA device, through the network.

The remote control server transfers the EPG (current) data to the IP remote controller through the network. On the side of the IP remote controller, the CPU 11 analyzes the received EPG (current) data to create an EPG view. The GDP 18 performs display processing of an EPG (current) view to display and output an EPG view on the LCD 19.

Figure 10:
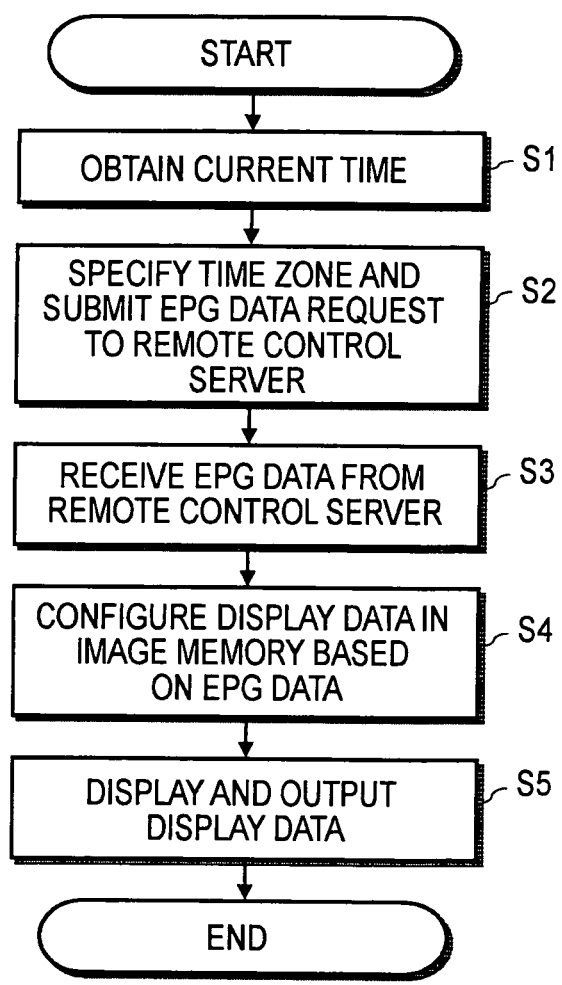
FIG. 10 is a flowchart showing a processing procedure executed by the IP remote controller to display the EPG (current) data.

FIG. 10 is a flowchart showing a processing procedure executed by the IP remote controller to display the EPG (current) data.

When an EPG (current) data display request is entered from the input switch matrix unit 14, first, current time is obtained (step S1).

Then, a time zone is specified, and an EPG data request is transmitted to the remote control server (step S2).

When the IP remote controller receives EPG data from the remote control server (step S3), the CPU 11 configures display data of an EPG view based on the EPG data (step S4).

Then, the GDP 18 outputs the generated display data on the screen of the LCD 19 (step S5).

By specifying a next time zone instead of the current time and submitting an EPG data request, the IP remote controller can obtain EPG (future) data. As discussed above, a recording reservation of a television program can be set through the EPG (future) view. In the following, some examples regarding an operation procedure for setting a recording reservation of a program in a recording device by the IP remote controller using EPG (future) data will be described. In either case, it is assumed that a recording device, such as an HDD recorder, is an IR device without a network communication function, which can be remotely controlled only by an infrared communication method such as SIRCS.

Figure 11:
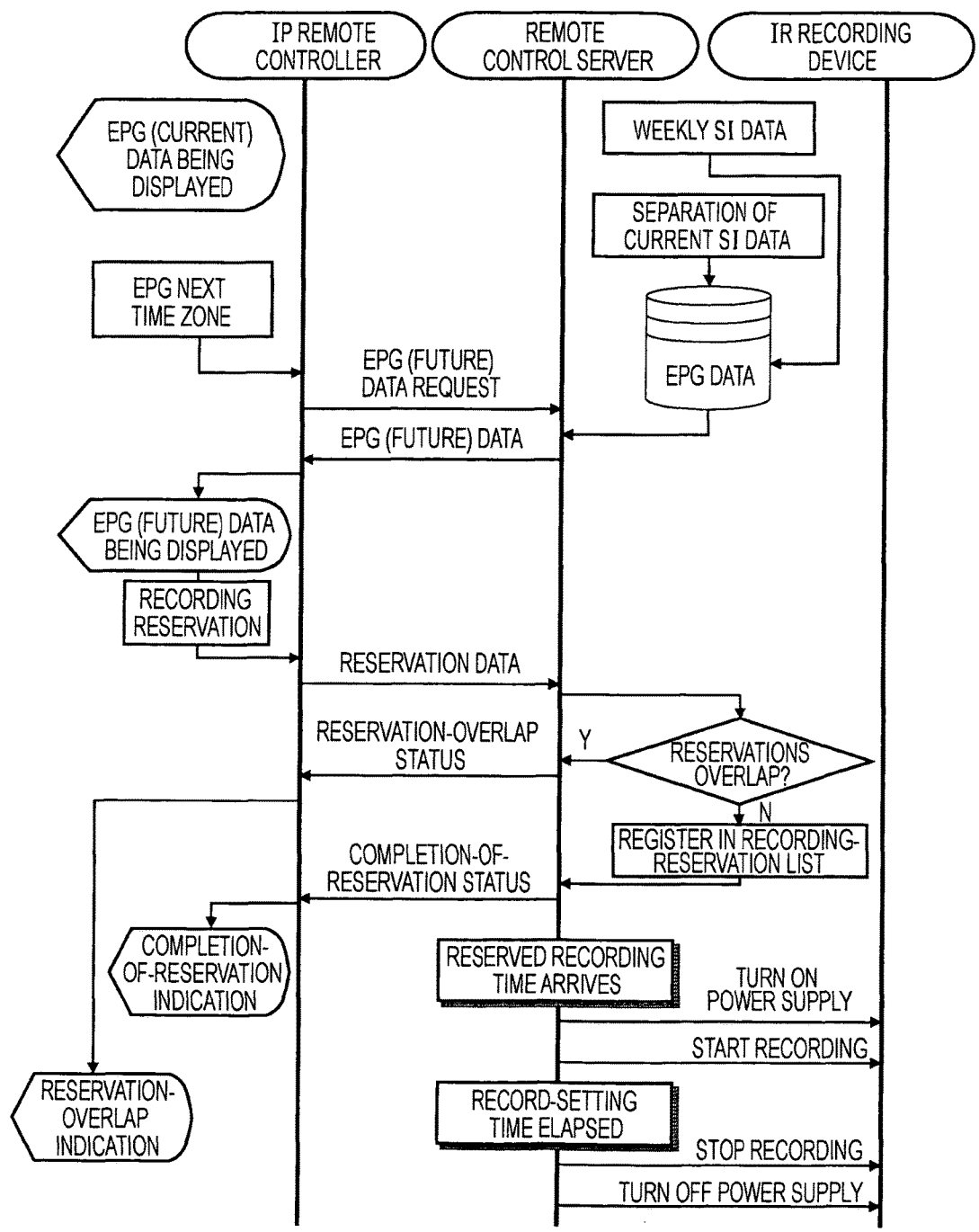
FIG. 11 is a diagram showing an example of an operation sequence in which a recording reservation of a program is set in a recording device by the IP remote controller using the EPG (future) data.

FIG. 11 shows an example of an operation sequence in which a recording reservation of a program is set in the IR recording device by the IP remote controller using EPG (future) data. In the illustrated example, it is assumed that the remote control server manages a recording-reservation list.

The remote control server connected to the television receiver stores weekly SI data as EPG data. Current SI data superimposed on a received broadcast wave is separated and stored as EPG data.

On the side of the IP remote controller, meanwhile, it is assumed that an EPG (current) view is currently displayed. When Set EPG Next Time Zone View is entered via the input switch matrix unit 14, a request for EPG (future) data is transmitted in response from the IP remote controller to the remote control server integrally formed with the television receiver through the network.

The remote control server transfers the EPG (future) data to the IP remote controller through the network. Then, on the side of the IP remote controller, the CPU 11 analyzes the received EPG (future) data to create an EPG view. Then, the GDP 18 performs display processing of an EPG (future) view to display and output an EPG view on the LCD 19.

Then, on the side of the IP remote controller, it is assumed that the user has selected on the EPG (future) display view a television program to be reserved for recording by using the input switch matrix unit 14. In response to this, a recording reservation request is transmitted together with reservation data to the remote control server through the network.

The remote control server analyzes the received recording reservation request to determine whether or not overlapping reservations which record the same program have been requested. If overlapping reservations are found, the remote control server returns a reservation-overlap status to the IP remote controller through the network. On the side of the IP remote controller, an error indication is displayed through the LCD 19.

If there is no overlapping request for making recording reservations, the remote control server adds the requested recording reservation as a new entry in the recording-reservation list managed in the remote control server. Then, a completion-of-reservation status is returned to the IP remote controller through the network. On the side of the IP remote controller, a completion-of-reservation indication is displayed through the LCD 19.

Subsequently, the remote control server stands by until the reserved recording time. When the reserved recording time arrives, the remote control server transmits an SIRCS command for turning on the power supply to the IR recording device to start the recording of the television program reserved for recording.

Then, when the record-setting time has elapsed, the remote control server transmits an SIRCS command for stopping the recording operation and then a SIRCS command for turning off the power supply to the IR recording device to terminate the overall recording reservation operation.

In the example operation shown in FIG. 11, it is necessary to render both the remote control server and the IR recording device to be active at the reserved recording time.

Figure 12:
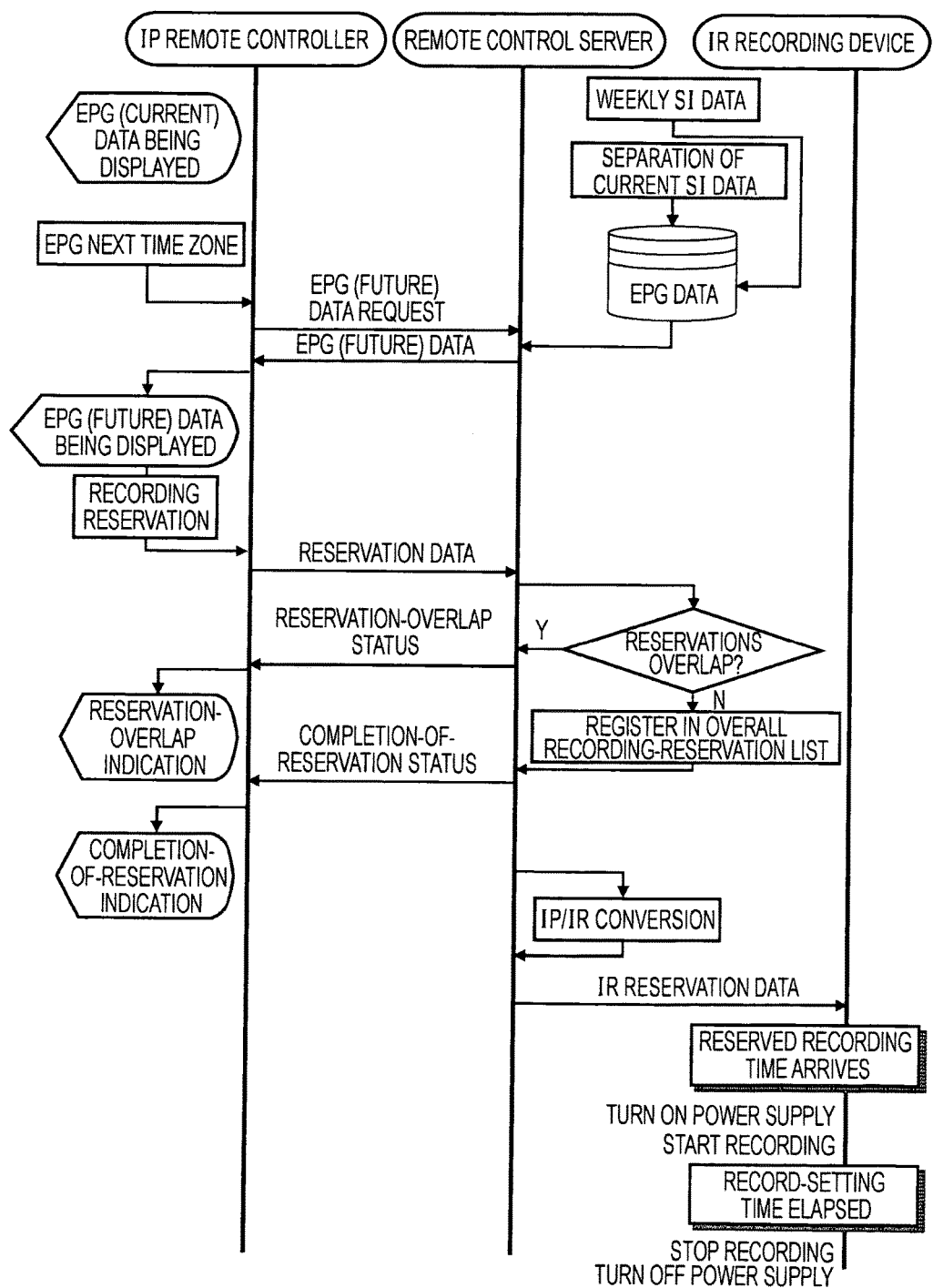
FIG. 12 is a diagram showing another example of the operation sequence in which a recording reservation of a program is set in the recording device by the IP remote controller using the EPG (future) data.

FIG. 12 shows another example of the operation sequence in which a recording reservation of a program is set in the recording device by the IP remote controller using EPG (future) data. In the illustrated example, it is assumed that the remote control server manages a recording-reservation list and transfers reservation data to the recording device.

The remote control server connected to the television receiver stores weekly SI data as EPG data. Current SI data superimposed on a received broadcast wave is separated and stored as EPG data.

On the side of the IP remote controller, meanwhile, it is assumed that an EPG (current) view is currently displayed. When Set EPG Next Time Zone View is entered via the input switch matrix unit 14, a request for EPG (future) data is transmitted in response from the IP remote controller to the remote control server integrally formed with the television receiver through the network.

The remote control server transfers the EPG (future) data to the IP remote controller through the network. Then, on the side of the IP remote controller, the CPU 11 analyzes the received EPG (future) data to create an EPG view. Then, the GDP 18 performs display processing of an EPG (future) view to display and output an EPG view on the LCD 19.

Then, on the side of the IP remote controller, it is assumed that the user has selected on the EPG (future) display view a television program to be reserved for recording by using the input switch matrix unit 14. In response to this, a recording reservation request is transmitted together with reservation data to the remote control server through the network.

The remote control server analyzes the received recording reservation request to determine whether or not overlapping reservations which record the same program have been requested. If overlapping reservations are found, the remote control server returns a reservation-overlap status to the IP remote controller through the network. On the side of the IP remote controller, an error indication is displayed through the LCD 19.

If there is no overlapping request for making recording reservations, the remote control server adds the requested recording reservation as a new entry in the recording-reservation list managed in the remote control server. Then, a completion-of-reservation status is returned to the IP remote controller through the network. On the side of the IP remote controller, a completion-of-reservation indication is displayed through the LCD 19.

If the recording device is an IR device that can be remotely controlled only by an infrared communication method, the recording-reservation request command transferred through the IP network is subjected to IP/IR protocol conversion to produce an infrared communication command, such as SIRCS, to transfer the reservation data to the recording device. The reservation data includes meta-information obtained from the EPG, such as the name of a television program to be reserved for recording, the recording date and time, and the broadcast station.

Upon receiving recording-reservation data, the recording device adds the requested recording reservation as a new entry in the recording-reservation list managed in the recording device. When the reserved recording time arrives, the power supply of the recording device is turned on to start the recording of the television program reserved for recording.

Then, when the record-setting time has elapsed, the recording device stops the recording operation, and turns off the power supply to terminate the overall recording reservation operation.

In the example operation shown in FIG. 12, it is sufficient to render only the recording device to be active at the reserved recording time, and the power supply of the remote control server can be turned off after completion of the recording reservation.

Figure 13:
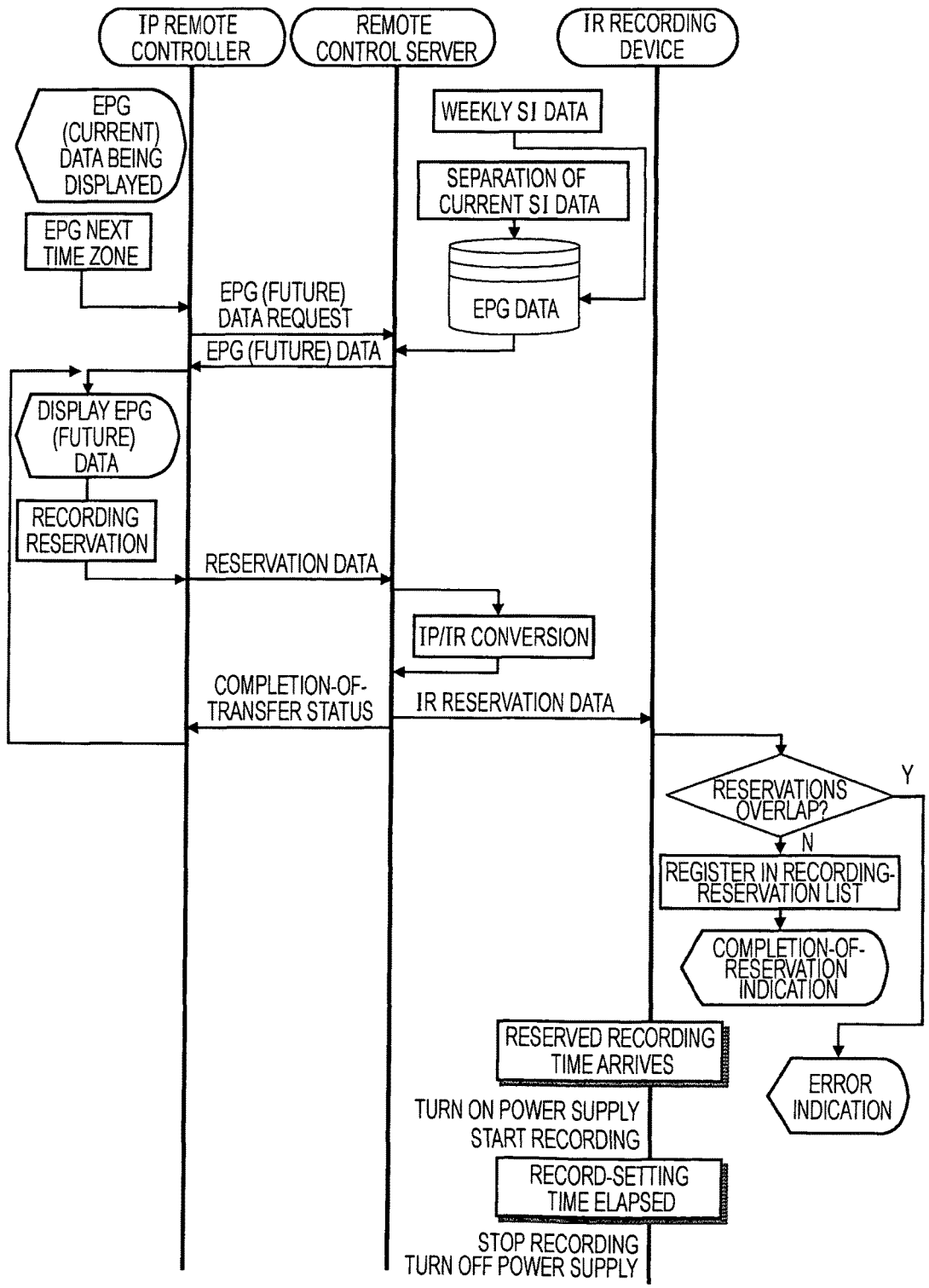
FIG. 13 is a diagram showing still another example of the operation sequence in which a recording reservation of a program is set in the recording device by the IP remote controller using the EPG (future) data.

FIG. 13 shows still another example of the operation sequence in which a recording reservation of a program is set in the recording device by the IP remote controller using EPG (future) data. In the illustrated example, it is assumed that the recording device manages a recording-reservation list.

The remote control server connected to the television receiver stores weekly SI data as EPG data. Current SI data superimposed on a received broadcast wave is separated and stored as EPG data.

On the side of the IP remote controller, meanwhile, it is assumed that an EPG (current) view is currently displayed. When Set EPG Next Time Zone View is entered via the input switch matrix unit 14, a request for EPG (future) data is transmitted in response from the IP remote controller to the remote control server integrally formed with the television receiver through the network.

The remote control server transfers the EPG (future) data to the IP remote controller through the network. Then, on the side of the IP remote controller, the CPU 11 analyzes the received EPG (future) data to create an EPG view. Then, the GDP 18 performs display processing of an EPG (future) view to display and output an EPG view on the LCD 19.

Then, on the side of the IP remote controller, it is assumed that the user has selected on the EPG (future) display view a television program to be reserved for recording by using the input switch matrix unit 14. In response to this, a recording reservation request is transmitted together with reservation data to the remote control server through the network.

If the recording device is an IR device that can be remotely controlled only by an infrared communication method, the remote control server performs IP/IR protocol conversion on the recording-reservation request command transferred through the IP network to produce an infrared communication command, such as SIRCS, and transfers the reservation data to the recording device. The reservation data includes meta-information obtained from the EPG, such as the name of the television program to be reserved for recording, the recording date and time, and the broadcast station. The remote control server returns a status indicating completion of the transfer of the recording-reservation request to the IP remote controller through the network.

On the side of the recording device, upon receiving reservation data via infrared communication, it is analyzed to determine whether or not overlapping reservations to record the same program have been requested. If overlapping reservations are found, an error indication is displayed. If there is no overlapping request for making recording reservations, the requested recording reservation is added as a new entry in the recording-reservation list managed in the recording device, and a completion-of-reservation indication is displayed.

When the reserved recording time arrives, the recording device turns on the power supply to start the recording of the program reserved for recording.

Then, when the record-setting time has elapsed, the recording device stops the recording operation, and then turns off the power supply to terminate the overall recording reservation operation.

C-2. Moving-Image Playback Function

As discussed above, the IP remote controller according to the present embodiment has a codec processing function and a graphic display function, and is capable of playing back a moving image. For example, the IP remote controller decodes AV content distributed from a television receiver, a remote control server, or the like, which is a device to be controlled, to output audio and video.

In this connection, the remote control server or the like encodes an audio signal and video signal received as analog broadcast waves into a data format that can be played back on the IP remote controller, such as MPEG4 data, to distribute the encoded data to the IP remote controller through the IP network. Alternatively, the remote control server loads recorded content recorded at a high bit rate, such as MPEG1 or MPEG2 content, from an HDD recorder through the LAN, converts it into a low-bit-rate data format that can be received and played back by the IP remote controller, such as MPEG4 data, and distributes the converted data via streaming through the LAN.

An operation procedure of the moving-image playback function achieved by the remote control system according to the present embodiment will be explained with reference to FIGS. 14 to 19. It is assumed that a television set and an HDD recorder are provided as devices to be controlled by the IP remote controller. Among them, the television set is a DLNA device having a network communication function, such as ETHERNET™, while the HDD recorder is an IR device without a network communication function, which can be remotely operated only by a SIRCS-based infrared communication method. It is also assumed that the television set is connected to or integrally formed with the remote control server (see FIG. 4) and that an operation command from the IP remote controller to the HDD recorder is received through the network and is subjected to protocol conversion by the remote control server to transfer the converted command to the HDD recorder by means of an infrared communication method. Further, the remote control server and the HDD recorder are connected through AV input/output terminals.

Figure 14:
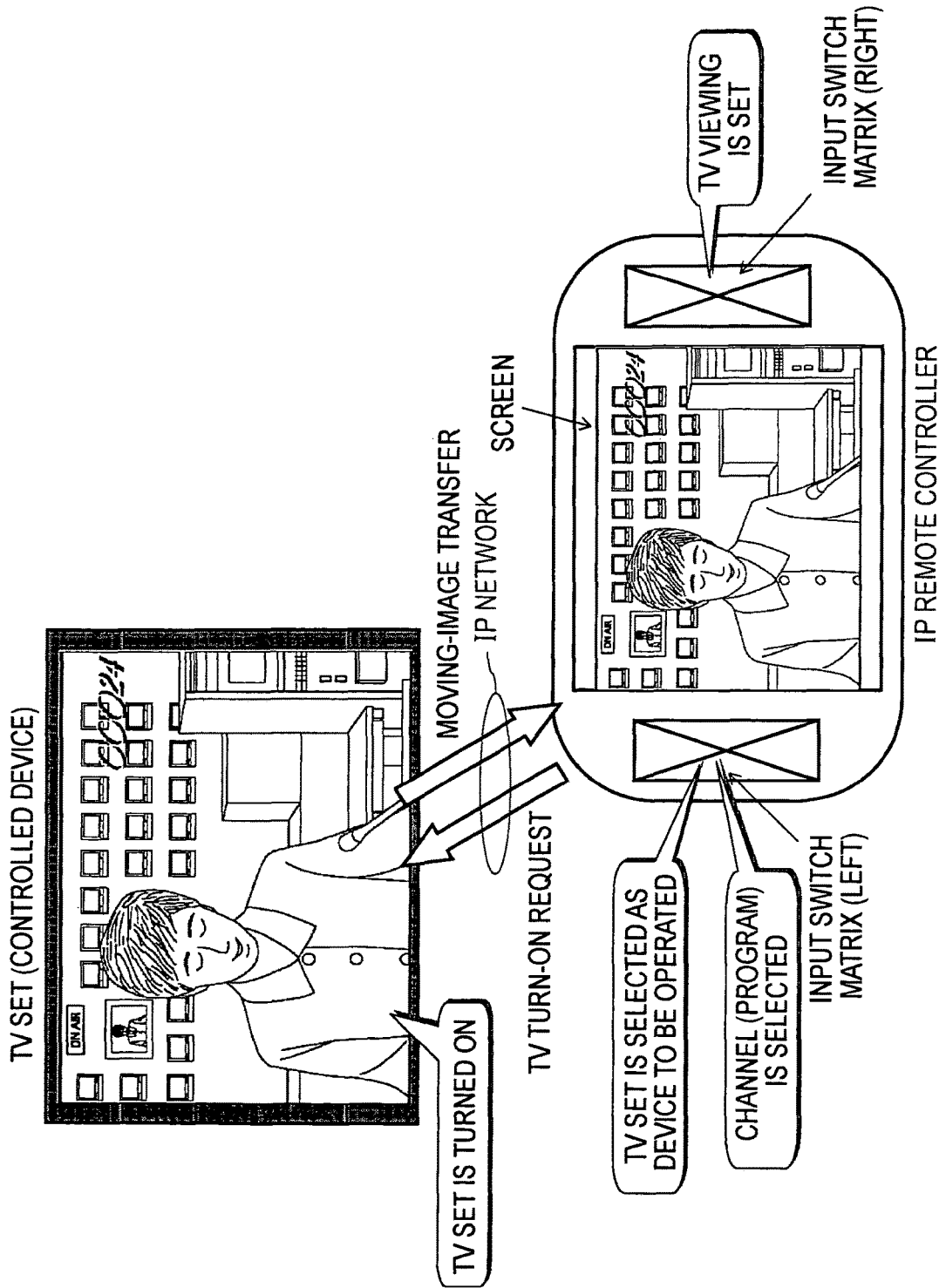
FIG. 14 is a diagram illustrating a manner in which a terrestrial analog broadcast received by the television set is viewed on the IP remote controller.

FIG. 14 illustrates a manner in which a terrestrial analog broadcast received by the television set is viewed by using the IP remote controller.

On the side of the IP remote controller, the television set is selected as a device to be operated through the input switch matrix unit 14. A request for turning on the power supply is transmitted from the IP remote controller to the television receiver serving as the device to be controlled, and the power supply of the television set is turned on in response to the request.

Then, on the side of the IP remote controller, a channel is selected through the input switch matrix unit 14. When a desired channel is determined, television viewing is set. Then, a moving-image transfer request is transmitted from the IP remote controller to the television set.

On the side of the television set, in response to the moving-image transfer request, an analog broadcast wave of the channel in which the viewing is set is received. Then; the analog video and audio signals are converted into a data format that can be handled by the IP remote controller, such as MPEG4 data, and are then distributed via streaming to the IP remote controller.

The IP remote controller decodes the thus transferred moving-image data to display the television program on the LCD 19.

The operation of displaying a television program currently being viewed on the television set or streaming video from the recording device on the IP remote controller is also referred to herein as a "catch".

Figure 15:
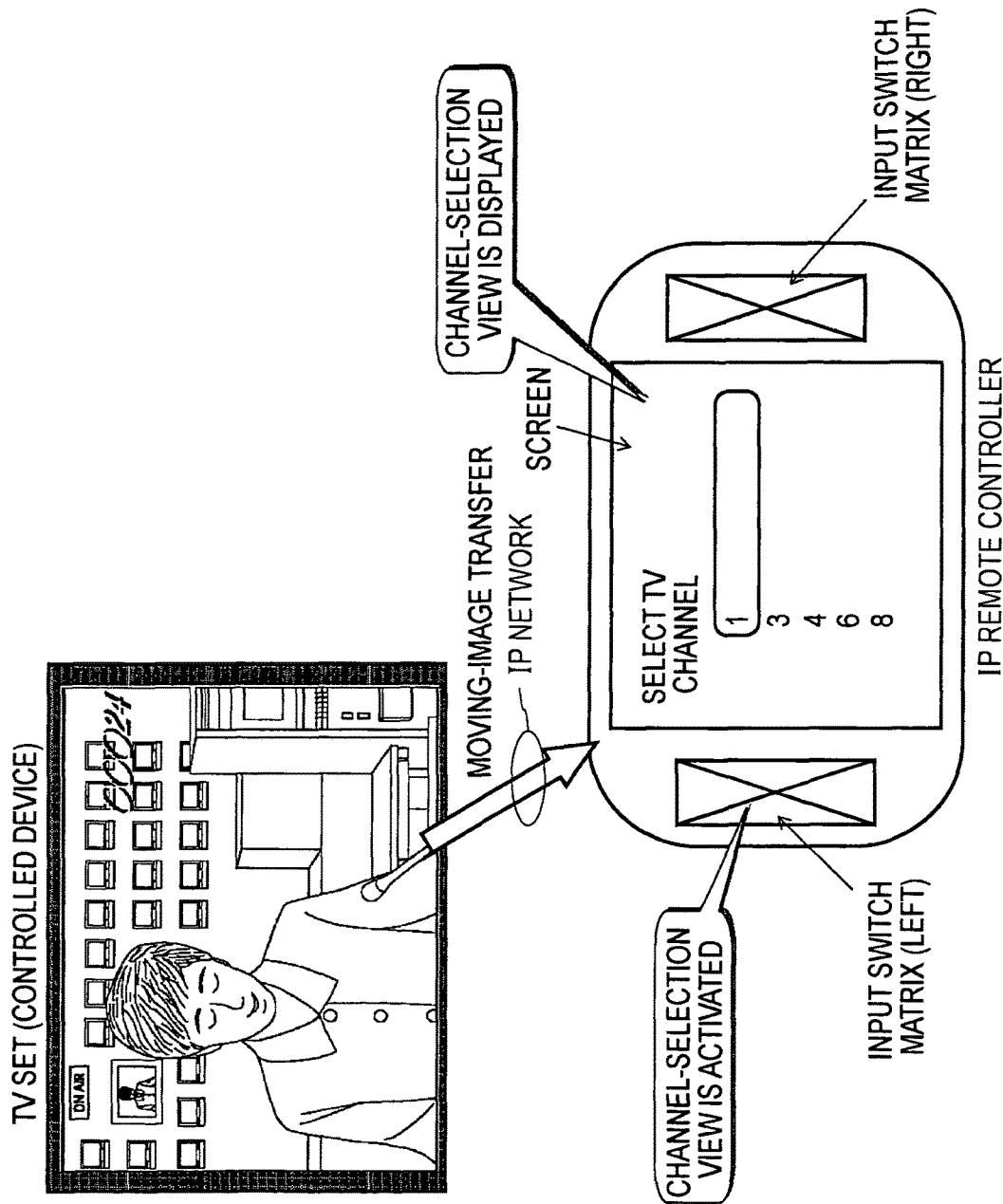
FIG. 15 is a diagram illustrating a manner in which a channel is changed in a period of time during which a terrestrial analog broadcast received by the television set is viewed on the IP remote controller.
Figure 16:
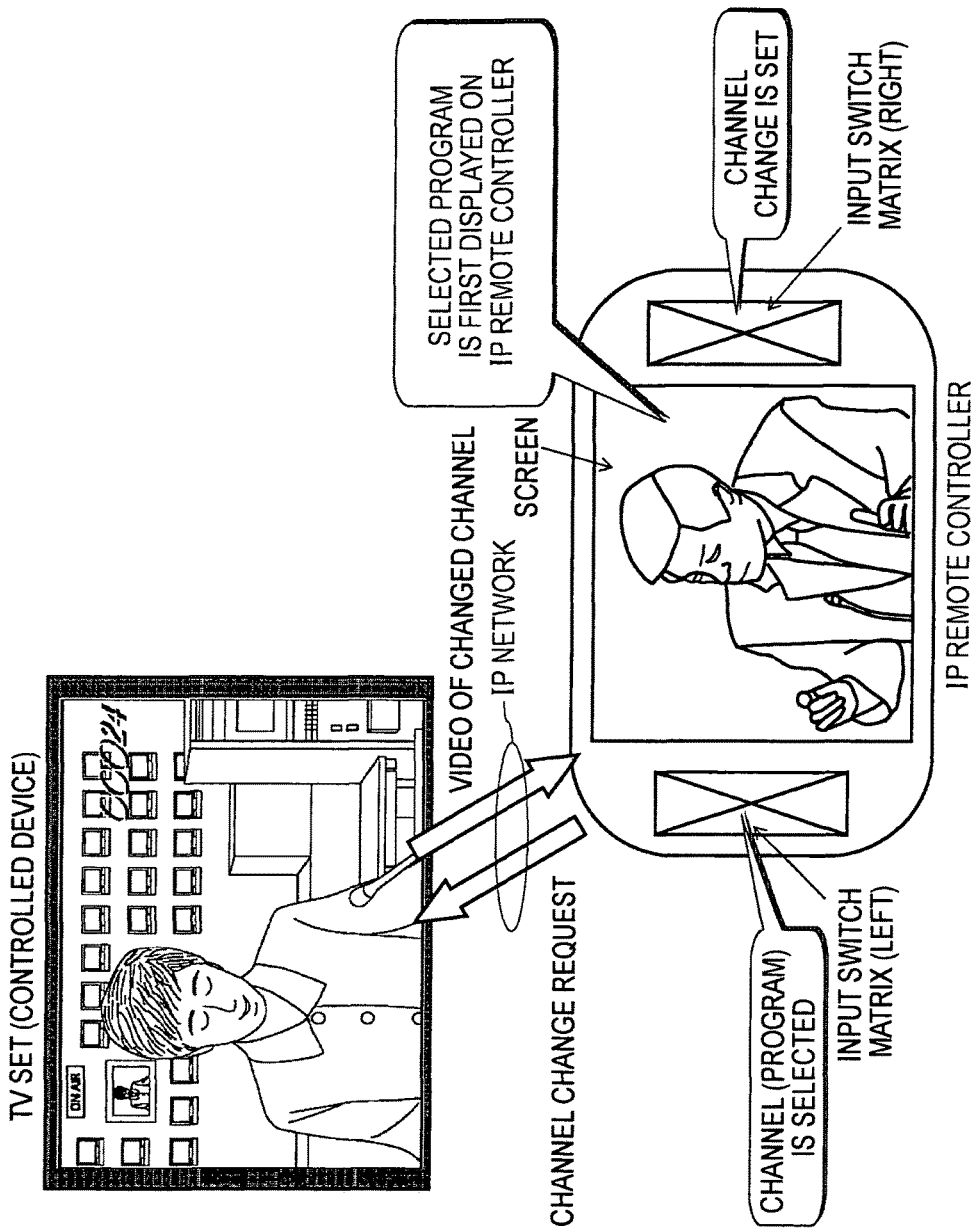
FIG. 16 is a diagram illustrating a manner in which a channel is changed in a period of time during which the terrestrial analog broadcast received by the television set is viewed on the IP remote controller.

FIGS. 15 to 16 illustrate a manner in which a channel is changed in a period of time during which a terrestrial analog broadcast received by the television set is viewed on the IP remote controller. It is assumed that the television set has a multi-tuner function capable of receiving broadcast waves from two or more channels at the same time.

As discussed above, the television set encodes a received broadcast program and distributes it to the IP remote controller via streaming, and the IP remote controller receives and decodes it to display the television program on the LCD 19. At this time, the same program is being displayed on the television screen and the LCD 19 of the IP remote controller.

On the side of the IP remote controller, a channel is selected through the input switch matrix unit 14. For example, if the IP remote controller is provided with a user interface, an operation for selecting the television set as the medium and placing a cursor position onto a desired channel is performed (not shown).

When a channel change is set, a channel-change request is transmitted from the IP remote controller to the television set.

In response to the channel-change request, the television set receives an analog broadcast wave on the determined channel, converts it into a data format that can be handled by the IP remote controller, such as MPEG4 data, and distributes the converted data to the IP remote controller via streaming.

Since the channel change is carried out on the IP remote controller, the television set still displays the program received on the initial channel. On the side of the IP remote controller, meanwhile, since the transferred moving-image data is decoded and displayed on the LCD 19, the television program of the changed channel can be viewed.

Figure 17:
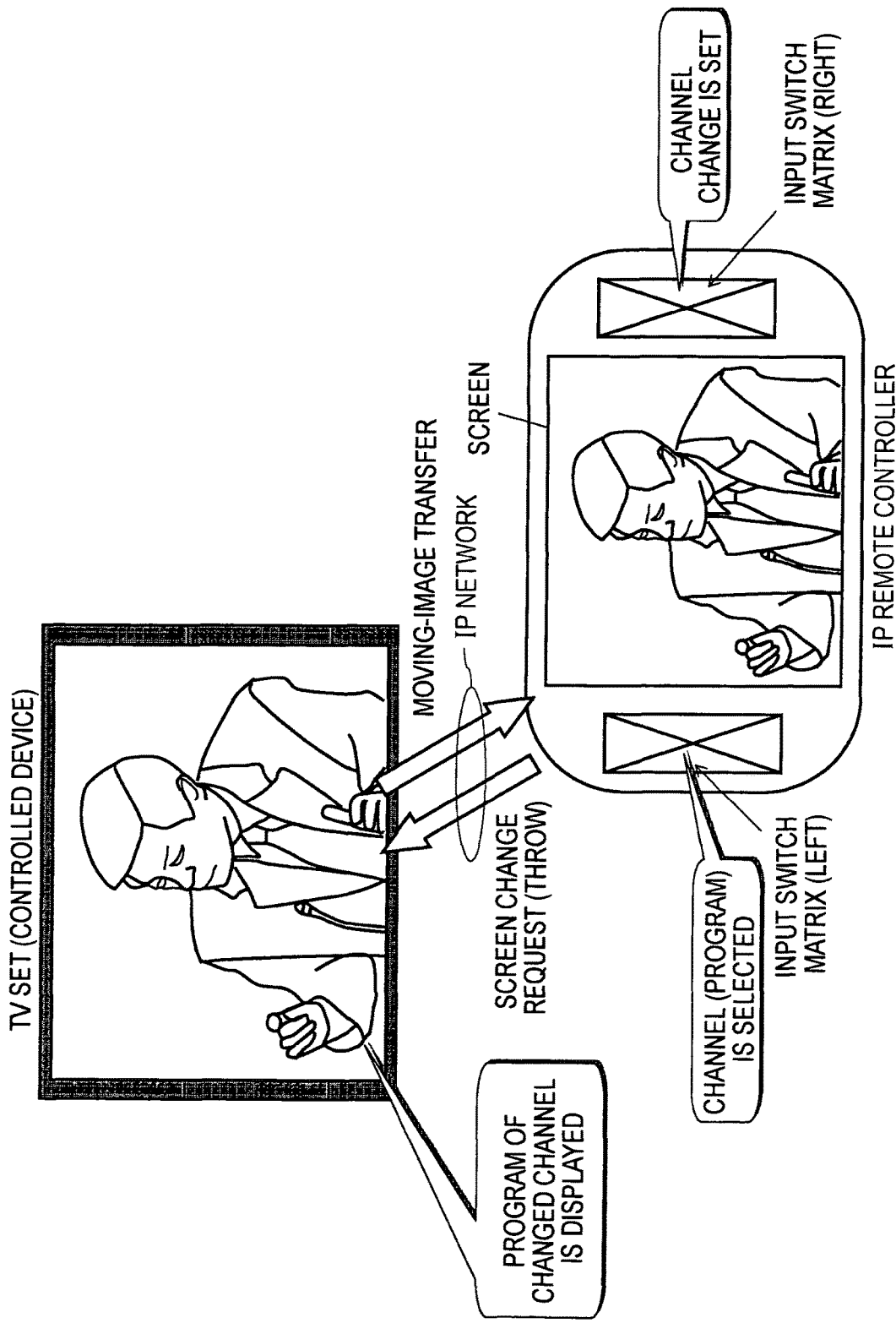
FIG. 17 is a diagram illustrating a manner in which a channel on the television set is changed to a television program currently being viewed on the IP remote controller.

FIG. 17 illustrates a manner in which the video displayed on the television set is changed to the television program currently being viewed on the IP remote controller.

As shown in FIG. 17, a screen change request for changing to the channel currently being viewed on the IP remote controller is transmitted to the television set.

In response to this request, the television set changes the screen to the designated channel, and displays the video of the television program of the changed channel. Then, the currently received analog video and audio signals are converted into a data format that can be handled by the IP remote controller, such as MPEG4 data, and is distributed to the IP remote controller via streaming.

The IP remote controller decodes the thus transferred moving-image data to display the television program on the LCD 19. As a result, the same program is displayed on the television screen and the LCD 19 of the IP remote controller.

The operation of displaying a television program or streaming video currently being viewed on the IP remote controller on the television set is also referred to herein as a "throw".

Figure 18:
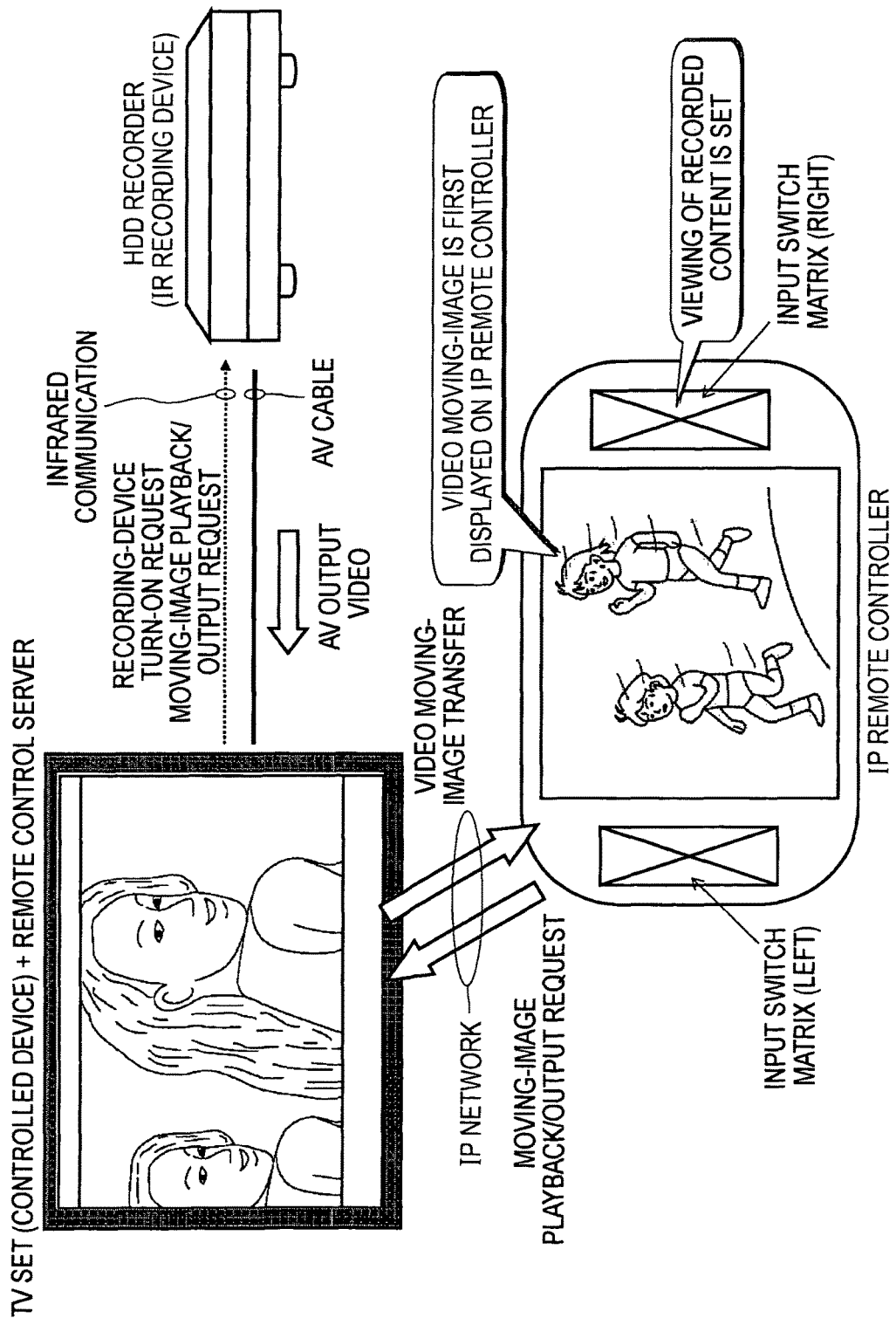
FIG. 18 is a diagram illustrating a manner in which a mode in which recorded content stored in a recording device is currently viewed on the IP remote controller is changed so that the recorded content is also viewed on the television set.
Figure 19:
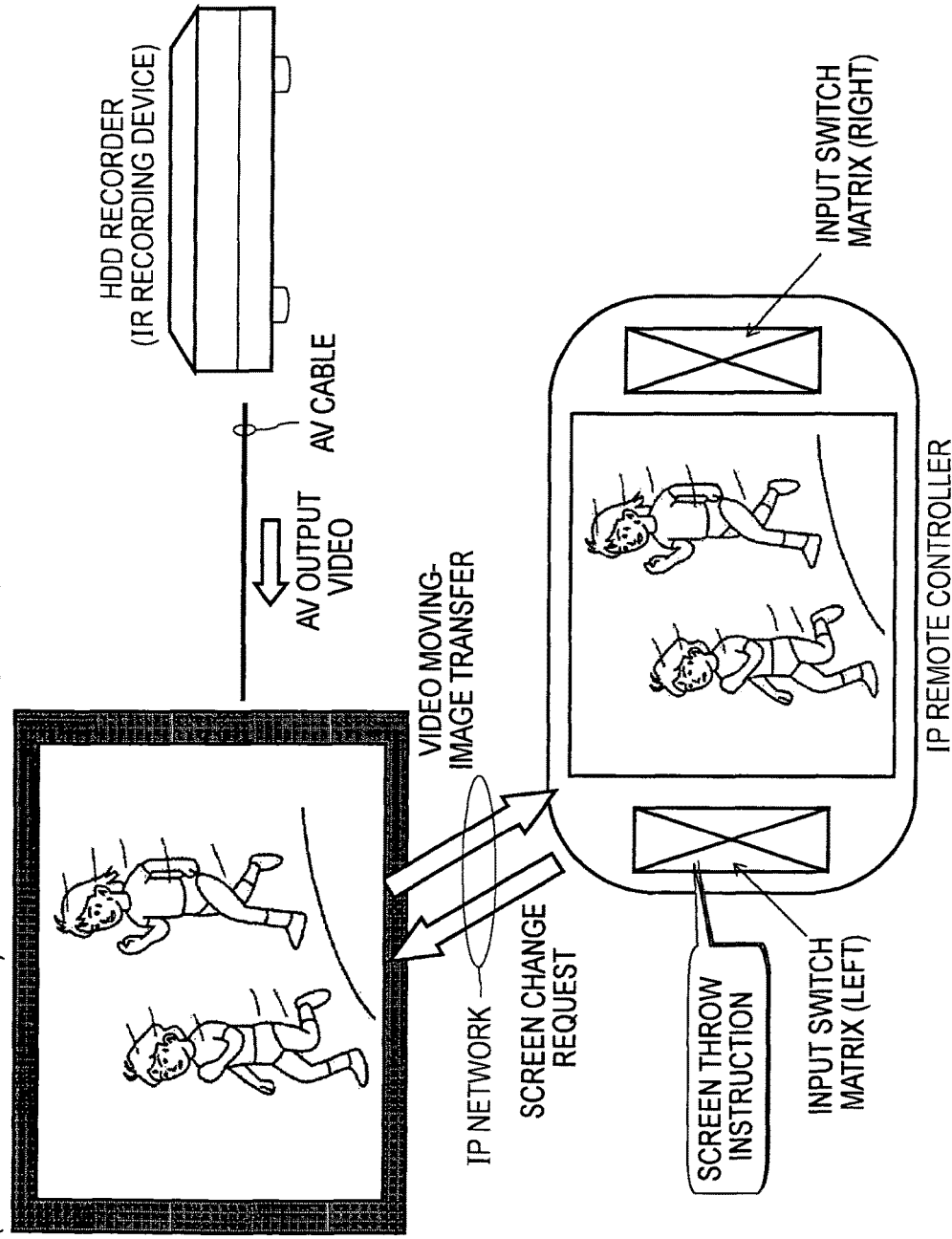
FIG. 19 is a diagram illustrating a manner in which the recorded content stored in the recording device is viewed on the IP remote controller.

FIGS. 18 to 19 illustrate a manner in which recorded content stored in the recording device is viewed on the IP remote controller.

On the side of the IP remote controller, the user uses the input switch matrix unit 14 to give instructions to turn on the recording device, such as an HDD recorder, and to distribute recorded content. These requests are transmitted to the remote control server integrally formed with the television receiver through the network.

In the illustrated example, the HDD recorder, which is the device to be controlled, is an IR device that can be operated only by an infrared remote control method. For the benefit of the HDD recorder, the remote control server performs IP/IR conversion on an operation command received from the IP remote controller through the network into a command for use in infrared communication such as SIRCS, and performs optical transmission by means of infrared light. If the legacy controlled device is in a dead angle from the remote control server or the distance therebetween is long, an infrared command is output to an AV mouse so that the infrared command is optically transmitted in the vicinity of the IR device. Meanwhile, if the HDD recorder is near the IP remote controller so as to be directly irradiated with infrared light, the IP remote controller may output an SIRCS command for requesting a recording reservation from the infrared communication unit 16.

In response to the SIRCS command, the HDD recorder turns on the power supply thereof, and supplies AV output video of the designated recorded content to the remote control server.

The remote control server encodes the AV output video of the HDD recorder into a data format that can be played back by the IP remote controller, such as MPEG4 data, and distributes it to the IP remote controller through the IP network. Alternatively, the remote control server loads recorded content recorded at a high bit rate, such as MPEG1 or MPEG2 content, from the HDD recorder, converts it into a low-bit-rate data format that can be received and played back by the IP remote controller, such as MPEG4 data, and distributes the converted data via streaming through the LAN.

On the side of the IP remote controller, the transferred moving-image data is decoded and displayed on the LCD 19, thus allowing the user to view the recorded content. The television set, on the other hand, still displays the program received on the initial channel.

As shown in FIG. 19, it is also possible to change the channel on the television side to the recorded content currently being viewed on the IP remote controller by means of a throw operation (discussed above).

In this case, a screen change request for changing to the recorded content currently being viewed on the IP remote controller is transmitted to the television set.

On the side of the television set, in response to this request, the AV output video from the HDD recorder is encoded and distributed to the IP remote controller while the display screen is also changed from the television video to the AV output video.

Figure 20:
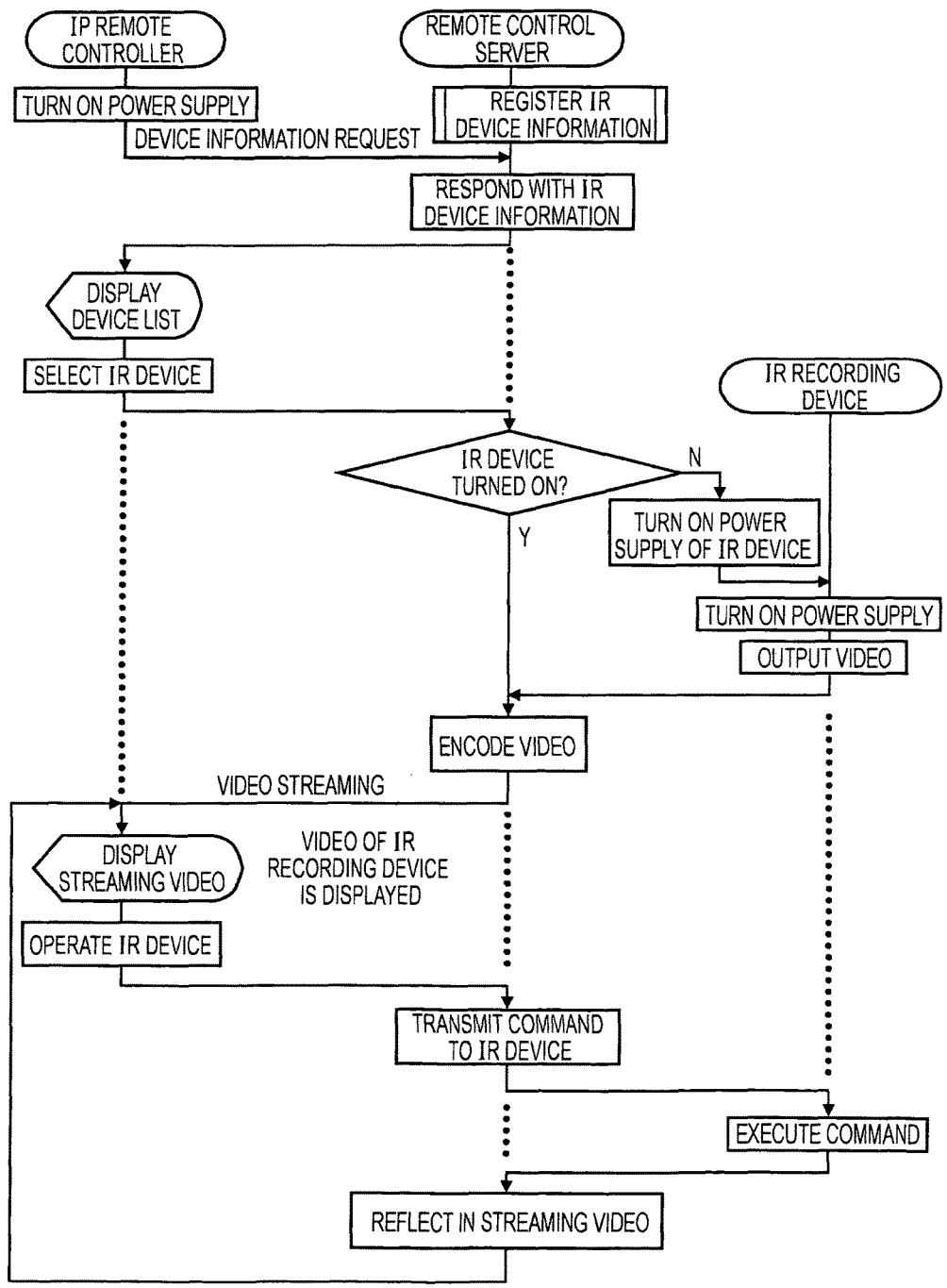
FIG. 20 is a diagram showing an example of an operation sequence for streaming AV content from an IR recording device to the IP remote controller.

FIG. 20 shows an example of an operation sequence for distributing AV content via streaming from an IR recording device that can be remotely controlled only by an infrared communication method to the IP remote controller.

In this case, a remote control server having a network connection function and a protocol conversion function into an infrared command is provided. The remote control server is connected to or integrally formed with, for example, a television set. Further, it is assumed that the remote control server pre-registers therein information concerning IR devices to which an infrared command can be transmitted from the remote control server.

The IP remote controller, when turned on, submits a request for device information concerning the IR devices to the remote control server through the network.

In response to the request for the device information, the remote control server returns the information concerning the IR devices to the IP remote controller through the network.

The received device list is displayed on the LCD 19 of the IP remote controller. When the user selects an IR device on this screen, a request for starting streaming of AV content to the selected IR device is transmitted to the remote control server through the network.

Upon receiving the request for starting streaming, the remote control server determines whether or not the requested IR device has been turned on and is outputting video. If the IR device has not been turned on, the IR device is turned on to start outputting video.

Then, the remote control server encodes the AV output video from the IR device into a data format that can be played back by the IP remote controller, such as MPEG4 data, and distributes it to the IP remote controller via streaming through the IP network.

The IP remote controller decodes the thus transferred moving-image data to display video on the LCD 19.

On the side of the IP remote controller, furthermore, even during the streaming display, operations for the IR device can be performed through the input switch matrix unit 14. The operations used herein include changing of output video, changing of channels, and so forth.

A command for the IR device is transmitted from the IP remote controller to the remote control server through the network. The remote control server converts the operation command received from the IP remote controller through the network into a command for use in infrared communication such as SIRCS, and performs optical transmission by means of infrared light.

The IR device executes the command received via infrared light. Then, streaming of video in which the execution result of the command has been reflected is performed via the remote control server.

If the device to be controlled by the IP remote controller is an IR device that can be remotely controlled only by an infrared communication method, as discussed above, a remote control server for performing protocol conversion on a command is provided. If the device to be controlled is a DLNA device having a network connection function, meanwhile, the intervention of the remote control server is not necessary because the IP remote controller is capable of performing a command operation through the network.

Figure 21:
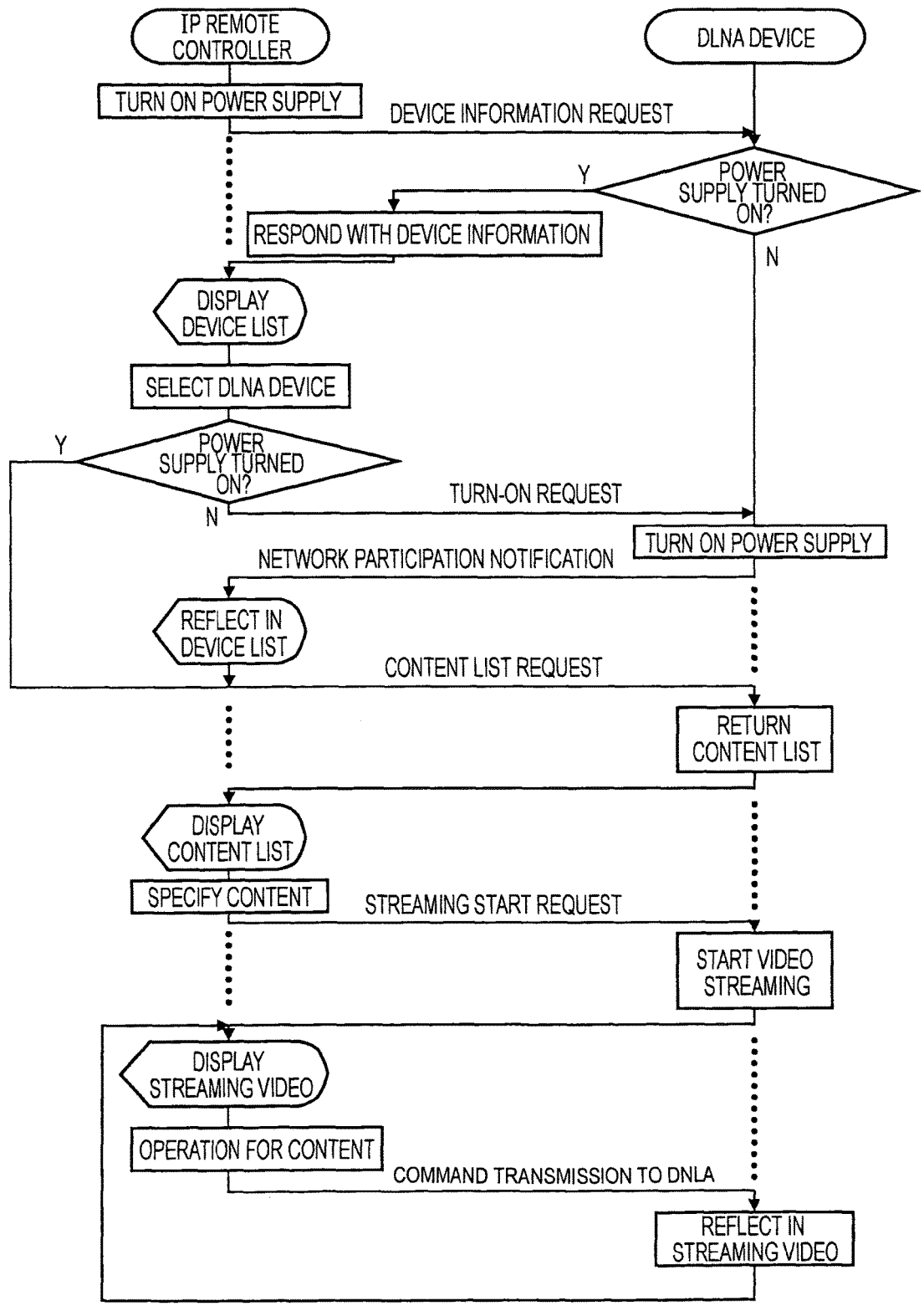
FIG. 21 is a diagram showing an example of an operation sequence for streaming AV content from a DLNA device to the IP remote controller.

FIG. 21 shows an example of an operation sequence for streaming AV content from a DLNA device to the IP remote controller.

The IP remote controller, when turned on, submits a request for device information to the DLNA device through the network.

In response to the device information request, the DLNA device, which has been turned on, returns the device information to the IP remote controller through the network.

A device list concerning DLNA devices that have responded is displayed on the screen of the LCD 19 of the IP remote controller. A DLNA device that responded with device information in the past is displayed as grayed-out. A DLNA device that has not responded for a predetermined period of time is determined to be disconnected from the network and is deleted from the device list.

When the user selects a DLNA device on the screen, it is determined whether or not the selected DLNA device has been turned on, that is, whether or not the device information has been returned. If the DLNA device has not been turned on, a request for turning on the power supply is transmitted to the DLNA device through the network.

Upon receiving the request for turning on the power supply, the DLNA device turns on the power supply, and returns a network participation notification to the IP remote controller. The IP remote controller reflects the activation of the DLNA device in the device list, and changes the grayed-out indication of the DLNA device to a normal indication.

If the selected DLNA device has been turned on, a request for a list of available content is submitted to the selected DLNA device through the network. In response to this, the DLNA device returns a content list to the IP remote controller. For example, the content list is a list of recorded content if the DLNA device is a recording device, such as an HDD recorder, and is a list of receivable channels if the DLNA device is a television set.

The received content list is displayed on the screen of the LCD 19 of the IP remote controller. When the user selects desired content on the screen, a request for starting streaming of the selected content is transmitted to the remote control server through the network.

Upon receiving the request for starting streaming, the DLNA device outputs the corresponding video, and encodes the AV output video into a data format that can be played back by the IP remote controller, such as MPEG4 data, to distribute the encoded data to the IP remote controller via streaming through the IP network.

The IP remote controller decodes the thus transferred moving-image data to display video on the LCD 19.

On the side of the IP remote controller, furthermore, even during the streaming display, operations for the content can be performed through the input switch matrix unit 14. The operations for the content used herein include changing of output video, changing of channels, and so forth.

A command for the content operations is sent from the IP remote controller to the DLNA device through the network. The DLNA device executes the received command to perform streaming of video in which the execution result of the command has been reflected.

Figure 22:
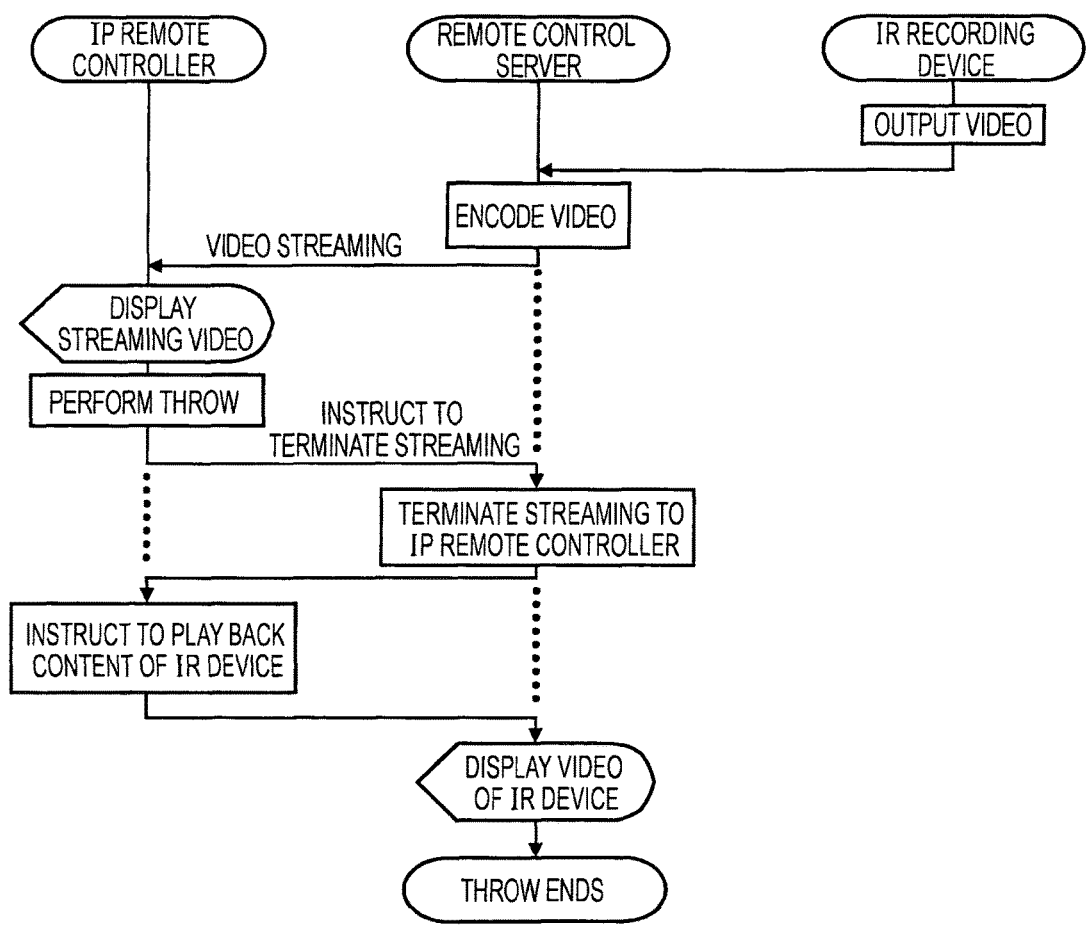
FIG. 22 is a diagram showing an example of an operation sequence for throwing content of an IR device currently being viewed on the IP remote controller onto the television set.

In accordance with the operation sequence shown in FIG. 20, the video content output from the IR recording device can be viewed on the IP remote controller. FIG. 22 shows an example of an operation sequence for "throwing" content of an IR device, currently being viewed on the IP remote controller onto a television set. It is assumed that the television set has a remote control server function.

AV video is output from an IR recording device, such as an HDD recorder or any other recording device. The television set utilizes the remote control server function to encode the AV output video into a data format that can be played back by the IP remote controller, such as MPEG4 data, to distribute the encoded data to the IP remote controller via streaming through the IP network. The IP remote controller decodes the transferred moving-image data to display video on the LCD 19.

It is assumed that a throw operation has been performed through the input switch matrix unit 14 at the side of the IP remote controller. The IP remote controller instructs the television set to stop streaming, and the television set stops streaming to the IP remote controller in response to the instruction.

Then, the IP remote controller instructs the television set to play back the content of the IR device. At this time, content is specified and played back. There are several sets by which the content is specified, such as a device, which is a content provider, and a display destination, the name of an AV input terminal of the television set and a display destination, and a function name of the television set and a display destination.

On the side of the television set, in response to the content playback instruction, AV output video from the IR recording device is displayed and output.

Figure 23:
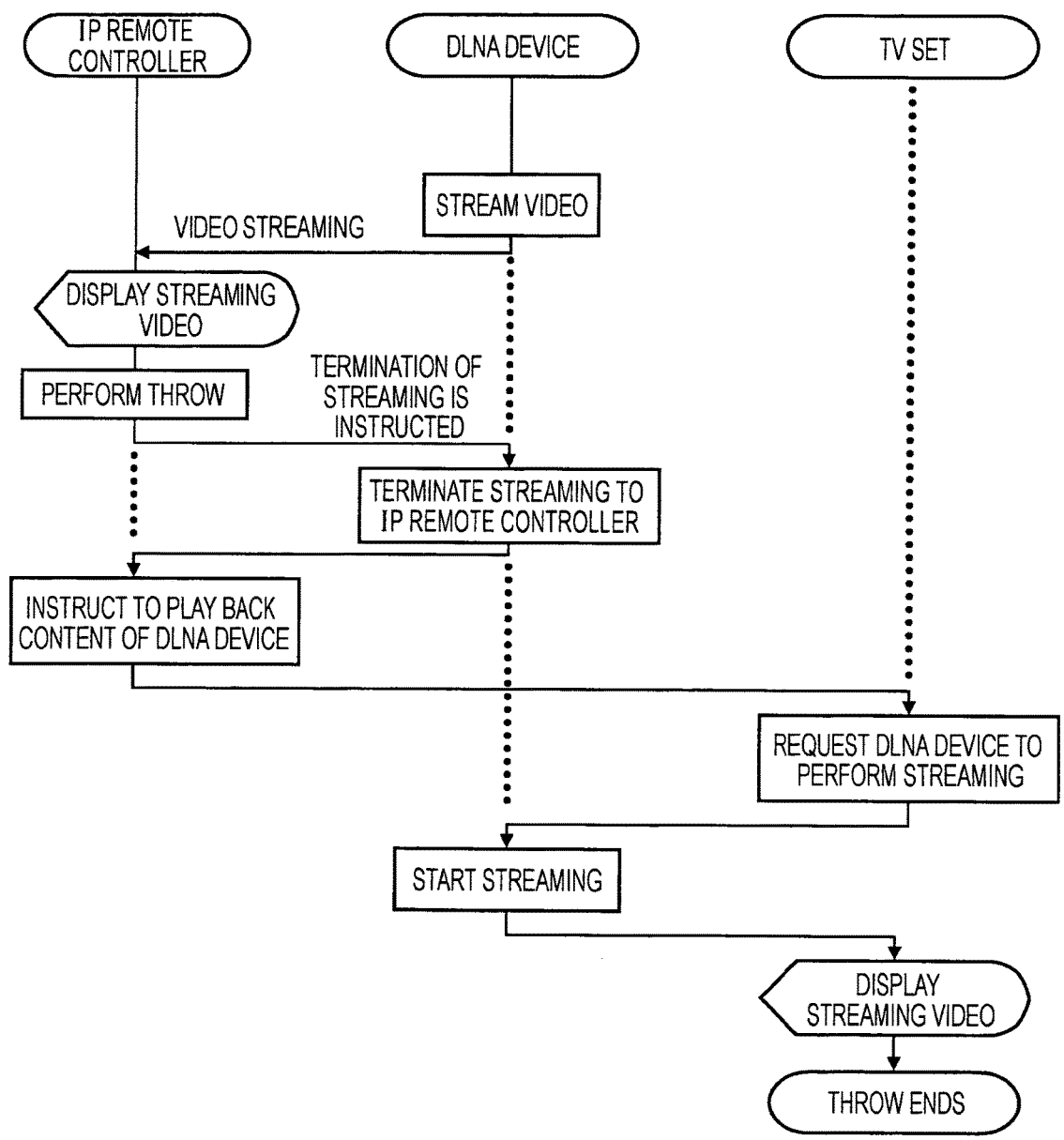
FIG. 23 is a diagram showing an example of an operation sequence for throwing content of a DLNA device currently being viewed on the IP remote controller onto the television set.

In accordance with the operation sequence shown in FIG. 21, video content output from the DLNA device can directly be viewed on the IP remote controller. FIG. 23 shows an example of an operation sequence for "throwing" content of a DLNA device currently being viewed on the IP remote controller onto a television set.

An HDD recorder or any other DLNA device having a recording function encodes AV output video into a data format that can be played by the IP remote controller, such as MPEG4 data, and distributes the encoded data to the IP remote controller via streaming through the IP network. The IP remote controller decodes the transferred moving-image data to display video on the LCD 19.

It is assumed that a throw operation has been performed through the input switch matrix unit 14 at the side of the IP remote controller. The IP remote controller instructs the DLNA device to stop streaming to the IP remote controller. In response to the instruction, the DLNA device stops streaming to the IP remote controller.

Then, the IP remote controller submits a content playback instruction through the network. In the playback instruction, a server, a content name, a playback start point, and a display destination are specified.

In response to this, the television set specified as the destination onto which the content is thrown requests the DLNA device to perform streaming. The DLNA device starts streaming of the specified content from the specified playback start point. The television set displays and outputs the received streaming video.

INDUSTRIAL APPLICABILITY

The present invention has been described in detail with reference to specific embodiments. However, it is obvious that modifications and alternatives of the embodiments may be made by those skilled in the art without departing from the scope of the present invention.

While a device to be controlled by an IP remote controller has been described herein in the context of a television receiver or a recording device such as an HDD recorder, the present invention is not limited thereto. Other devices handling AV content, or home electric appliances or information devices that do not handle AV content may also be used as devices to be controlled by the IP remote controller to construct the remote control system according to the present invention.

That is, the present invention has been disclosed by way of exemplary embodiments, and the contents disclosed herein should not be restrictively construed. The gist of the present invention should be determined in consideration of the claims.

The invention claimed is:
1. A portable terminal device comprising:
a first display screen; and
circuitry configured to:
  transmit and receive data through a local area network,
  decode the data to acquire audio content and video content, wherein the video content is converted into low-bit-rate data,
  store the video content,
  display the video content with the first display screen,
  receive an input that indicates a selection by a user to display the video content on a second display screen connected to an external device,
  receive, at the portable terminal device, a second input identifying a playback start point of the audio content or the video content, and
  transmit an instruction, based on the second input, directly to the external device through the local area network that controls the external device to
    receive the audio content and the video content that is converted into the low-bit-rate data,
    decode the video content that is converted into the low-bit-rate data, and display a moving-image stream of the video content that is decoded on the second display screen, wherein the input identifies the video content that is currently being displayed on the first display screen, and the instruction controls the external device to receive the video content that is currently being displayed on the first display screen as the video content that is converted into the low-bit-rate data.

2. The portable terminal device of claim 1, wherein the external device is a control server, and wherein the circuitry is further configured to receive the data from a second external device, the second external device being a content device.

3. The portable terminal device of claim 2, wherein the content device is in direct communication with the control server via audio/video cables.

4. The portable terminal device of claim 2, wherein the content device is a broadcast reception device of a content service provider.

5. The portable terminal device of claim 2, further comprising:

an input unit, wherein the first display screen is configured to output:

a program guide based on video contents of the content device, and a command interface configured to receive inputs using the input unit, the inputs including a third input indicating a selection of one of the video contents of the content device.

6. The portable terminal device of claim 5, wherein the inputs include:

a fourth input that identifies a channel from a channel list of the program guide and initiates a sending of a second instruction to the control server that controls the control server to process a second one of the video contents of the content device that is associated with the channel, and a fifth input that identifies a program within a program list of the program guide and initiates a sending of a third instruction to the control server that controls the control server to process a third one of the video contents of the content device by recording a stream of the program.

7. The portable terminal device of claim 2, wherein the circuitry is further configured to send a second instruction to the content device that controls the content device to provide the video content directly to the control server for processing.

8. The portable terminal device of claim 2, further comprising:

an input unit, wherein the circuitry is configured to:

access video contents of the content device, output a program guide with the first display screen, the program guide based on the video contents of the content device, receive a third input indicating a second selection of one of the video contents from the input unit, output a second moving-image stream with the first display screen, the second moving-image stream based on the second selection, receive a fourth input identifying a second playback start point of the second selection from the input unit, and receive a fifth input from the input unit, the third input initiates the sending of a second instruction to the control server that controls the control server to receive the second moving-image stream of the second selection that begins at the second playback start point directly from the content device.

9. The portable terminal device of claim 2, wherein the portable terminal device is directly connected to the control server and the content device through the local area network.

10. A method comprising:

receiving and transmitting, with circuitry of a portable terminal device, data through a local area network;

decoding, with the circuitry, the data that is received to acquire audio content and video content, wherein the video content is converted into low-bit-rate data;

storing, with the circuitry, the video content;

displaying, with the circuitry, the video content on a first display screen;

receiving, with the circuitry, an input that indicates a selection by a user to display the video content on a second display screen connected to an external device;

receiving, with the circuitry, a second input identifying a playback start point of the audio content or the video content; and transmitting, with the circuitry, an instruction, based on the second input, directly to the external device through the local area network that controls the external device to receive the audio content and the video content that is converted into the low-bit-rate data, decode the video content that is converted into the low-bit-rate data, and display a moving-image stream of the video content that is decoded on the second display screen, wherein the input identifies the video content that is currently being displayed on the first display screen, and wherein the instruction controls the external device to receive the video content that is currently being displayed on the first display screen as the video content that is converted into the low-bit-rate data.

11. The method of claim 10, wherein receiving and transmitting the data through the local area network further includes receiving the data from a second external device, the second external device being a content device, wherein the external device is a control server.

12. The method of claim 11, wherein the content device is in direct communication with the control server via audio/video cables.

13. The method of claim 11, wherein the content device is a broadcast reception device of a content service provider.

14. The method of claim 11, further comprising:

outputting, with the first display screen, a program guide based on the video content of the content device; and outputting, with the first display screen, a command interface configured to receive inputs including a third input indicating a selection of the video content of the content device.

15. The method of claim 14, wherein the inputs include:

a fourth input that identifies a channel from a channel list of the program guide and initiates a sending of a second instruction to the control server that controls the control server to process a second one of the video contents of the content device that is associated with the channel, and a fifth input that identifies a program within a program list of the program guide and initiates a sending of a third instruction to the control server that controls the control server to process a third one of the video contents of the content device by recording a stream of the program.

16. The method of claim 11, further comprising sending a second instruction to the content device that controls the content device to provide the video content directly to the control server for processing.

17. The method of claim 11, further comprising:
- accessing, with the circuitry, video contents of the content device,
- outputting, with the circuitry, a program guide with the first display screen, the program guide based on the video contents of the content device;
- receiving, with the circuitry, a third input indicating a second selection of one of the video contents from an input unit;
- outputting, with the circuitry, a second moving-image stream with the first display screen, the second moving-image stream based on the second selection;
- receiving, with the circuitry, a fourth input identifying a second playback start point of the second selection from the input unit; and
- receiving, with the circuitry, a fifth input from the input unit, the third input initiates the sending of a second instruction to the control server that controls the control server to receive the second moving-image stream of the second selection that begins at the second playback start point directly from the content device.

18. The method of claim 11, wherein receiving and transmitting the data through the local area network further includes receiving the data directly from at least one of the content device or the control server directly through the local area network.

19. A non-transitory computer-readable medium comprising program instructions that, when executed by circuitry, causes the circuitry to perform a set of operations comprising:
- receiving and transmitting data through a local area network;
- decoding the data that is received to acquire audio content and video content, wherein the video content is converted into low-bit-rate data;
- storing the video content;
- displaying the video content on a first display screen;
- receiving an input that indicates a selection by a user to display the video content on a second display screen connected to an external device;
- receiving a second input identifying a playback start point of the audio content or the video content; and
- transmitting an instruction, based on the second input, directly to the external device through the local area network that controls the external device to receive the audio content and the video content that is converted into the low-bit-rate data, decode the video content that is converted into the low-bit-rate data, and display a moving-image stream of the video content that is decoded on the second display screen,
- wherein the input identifies the video content that is currently being displayed on the first display screen, and
- wherein the instruction controls the external device to receive the video content that is currently being displayed on the first display screen as the video content that is converted into the low-bit-rate data.

20. The non-transitory computer-readable medium of claim 19, wherein receiving and transmitting the data through the local area network further includes receiving the data from a second external device, the second external device being a content device, wherein the external device is a control server.

21. The non-transitory computer-readable medium of claim 20, wherein the content device is a broadcast reception device of a content service provider.

22. The non-transitory computer-readable medium of claim 20, further comprising:
- controlling the first display screen to output a program guide based on the video content of the content device; and
- controlling the first display screen to output a command interface configured to receive inputs including a third input indicating a selection of the video content of the content device.

23. The non-transitory computer-readable medium of claim 22, wherein the inputs include:
- a fourth input that identifies a channel from a channel list of the program guide and initiates a sending of a second instruction to the control server that controls the control server to process a second one of the video contents of the content device that is associated with the channel, and
- a fifth input that identifies a program within a program list of the program guide and initiates a sending of a third instruction to the control server that controls the control server to process a third one of the video contents of the content device by recording a stream of the program.

24. The non-transitory computer-readable medium of claim 20, further comprising sending a second instruction to the content device that controls the content device to provide the video content directly to the control server for processing.

25. The non-transitory computer-readable medium of claim 20, further comprising:
- accessing video contents of the content device,
- outputting a program guide with the first display screen, the program guide based on the video contents of the content device;
- receiving a third input indicating a second selection of one of the video contents from an input unit;
- outputting a second moving-image stream with the first display screen, the second moving-image stream based on the second selection;
- receiving a fourth input identifying a second playback start point of the second selection from the input unit; and
- receiving a fifth input from the input unit, the third input initiates the sending of a second instruction to the control server that controls the control server to receive the second moving-image stream of the second selection that begins at the second playback start point directly from the content device.

26. The non-transitory computer-readable medium of claim 20, wherein receiving and transmitting the data through the local area network further includes receiving the data directly from at least one of the content device or the control server directly through the local area network.

27. A system comprising:
- an external device including a first display screen; and
- a portable terminal device including
  - a second display screen, and
  - circuitry configured to:
    - transmit and receive data through a local area network,
    - decode the data to acquire audio content and video content, wherein the video content is converted into low-bit-rate data, store the video content, display the video content with the second display screen, receive an input that indicates a selection by a user to display the video content on the first display screen of the external device, receive, at the portable terminal device, a second input identifying a playback start point of the audio content or the video content, and transmit an instruction, based on the second input, directly to the external device through the local area network that controls the external device to receive the audio content and the video content that is converted into the low-bit-rate data, decode the video content that is converted into the low-bit-rate data, and display a moving-image stream of the video content that is decoded on the first display screen, wherein the input identifies the video content that is currently being displayed on the second display screen, and the instruction controls the external device to receive the video content that is currently being displayed on the second display screen as the video content that is converted into the low-bit-rate data.

28. The system of claim 27, further comprising:
a second external device,
wherein the external device is a control server and the second external device is a content device, and
wherein the circuitry is further configured to receive the data from the second external device.

29. The system of claim 28, wherein the content device is in direct communication with the control server via audio/video cables.

30. The system of claim 28, wherein the content device is a broadcast reception device of a content service provider.

31. The system of claim 28, wherein the portable terminal device further includes
an input unit,
wherein the second display screen is configured to output:
a program guide based on video contents of the content device, and
a command interface configured to receive inputs using the input unit, the inputs including a third input indicating a selection of one of the video contents of the content device.

32. The system of claim 31, wherein the inputs include:
a fourth input that identifies a channel from a channel list of the program guide and initiates a sending of a second instruction to the control server that controls the control server to process a second one of the video contents of the content device that is associated with the channel, and
a fifth input that identifies a program within a program list of the program guide and initiates a sending of a third instruction to the control server that controls the control server to process a third one of the video contents of the content device by recording a stream of the program.

33. The system of claim 28, wherein the circuitry is further configured to
send a second instruction to the content device that controls the content device to provide the video content directly to the control server for processing.

34. The system of claim 28, wherein the portable terminal device further includes
an input unit,
wherein the circuitry is configured to:
access video contents of the content device,
output a program guide with the second display screen, the program guide based on the video contents of the content device,
receive a third input indicating a second selection of one of the video contents from the input unit,
output a second moving-image stream with the second display screen, the second moving-image stream based on the second selection,
receive a fourth input identifying a second playback start point of the second selection from the input unit, and
receive a fifth input from the input unit, the third input initiates the sending of a second instruction to the control server that controls the control server to receive the second moving-image stream of the second selection that begins at the second playback start point directly from the content device.

35. The system of claim 28, wherein the portable terminal device is directly connected to the control server and the content device through the local area network.

* * * * *